United States Patent [19]

Takahashi et al.

[11] Patent Number: 5,767,982
[45] Date of Patent: Jun. 16, 1998

[54] IMAGE FORMING APPARATUS WITH EXPOSURE CONTROL HAVING A SMOOTHING FUNCTION

[75] Inventors: Yoshikazu Takahashi; Satoshi Hirota; Yu Tsuda, all of Ebina, Japan

[73] Assignee: Fuji Xerox Co., Ltd., Tokyo, Japan

[21] Appl. No.: 729,368

[22] Filed: Oct. 17, 1996

[51] Int. Cl.$^6$ ............................ H04N 1/29; H04N 1/40
[52] U.S. Cl. .................... 358/300; 358/298; 358/458
[58] Field of Search .......................... 358/296, 298, 358/300, 302, 401, 448, 456, 458, 519, 521, 530–532; 347/129–133, 224, 225, 254; 399/51, 177, 181; 219/216

[56] References Cited

U.S. PATENT DOCUMENTS

| | | | |
|---|---|---|---|
| 5,115,259 | 5/1992 | Itoh | 347/129 X |
| 5,579,090 | 11/1996 | Sasanuma et al. | 358/521 X |
| 5,633,669 | 5/1997 | Hada et al. | 347/132 |

FOREIGN PATENT DOCUMENTS

| | | |
|---|---|---|
| 53-41115 | 4/1978 | Japan . |
| A-1-169454 | 7/1989 | Japan . |
| A-2-112966 | 4/1990 | Japan . |
| A-3-287171 | 12/1991 | Japan . |
| A-4-189564 | 7/1992 | Japan . |
| A-4-268867 | 9/1992 | Japan . |

OTHER PUBLICATIONS

"Positive Charging Organic Photoconductor Using Perinone Bisazopigment Dispersed in Hole Transport Matrix", Itaru Ogawa et al., Japan Hardcopy, 1988, pp. 66–69.

"Positive Charged Mono–layered Photoreceptor with Perylene Pigment", Toru Nakazawa et al., Japan Hardcopy, 1988, pp. 70–73.

"High Gamma OPC For High Speed LED Printer", J. Decker et al., IS&T's Seventh International Congress Advances in Non–impact Printing Technologies, 1991, pp. 328–335.

"Positively–Charged Mono–layer Photoreceptor with $H_2$–Phthalocyanine", S. Tsuchiya et al., Matsushita Research Institute Tokyo, Inc., 1991, pp. 336–343.

*Primary Examiner*—Eric Frahm
*Attorney, Agent, or Firm*—Oliff & Berridge, PLC

[57] ABSTRACT

An image forming apparatus using a photosensitive body (1) having high gamma characteristics has an exposure unit that is provided with a radiation element whose exposure value is variably set and which is capable of blinking on a pixel-by-pixel basis. An exposure controller (6) is provided with an exposure pattern determining unit (7) that determines an exposure pattern according to the image pattern, and an exposure value switching unit (8) that switches between an exposure value A1 at which the potential of the photosensitive body (1) sharply attenuates and an exposure value A2 at which the potential of the photosensitive body (1) does not substantially attenuate, on the basis of the exposure pattern determined by the exposure pattern determining unit (7). The exposure pattern determining unit (7) is provided with an image area processor (9) that exposes image pixels to an intensive beam having the exposure value A1, and a smoothing processor (10 and 11) that exposes at least white pixels which are adjacent to the image pixels and are to be smoothed to a weak beam having the exposure value A2.

7 Claims, 19 Drawing Sheets

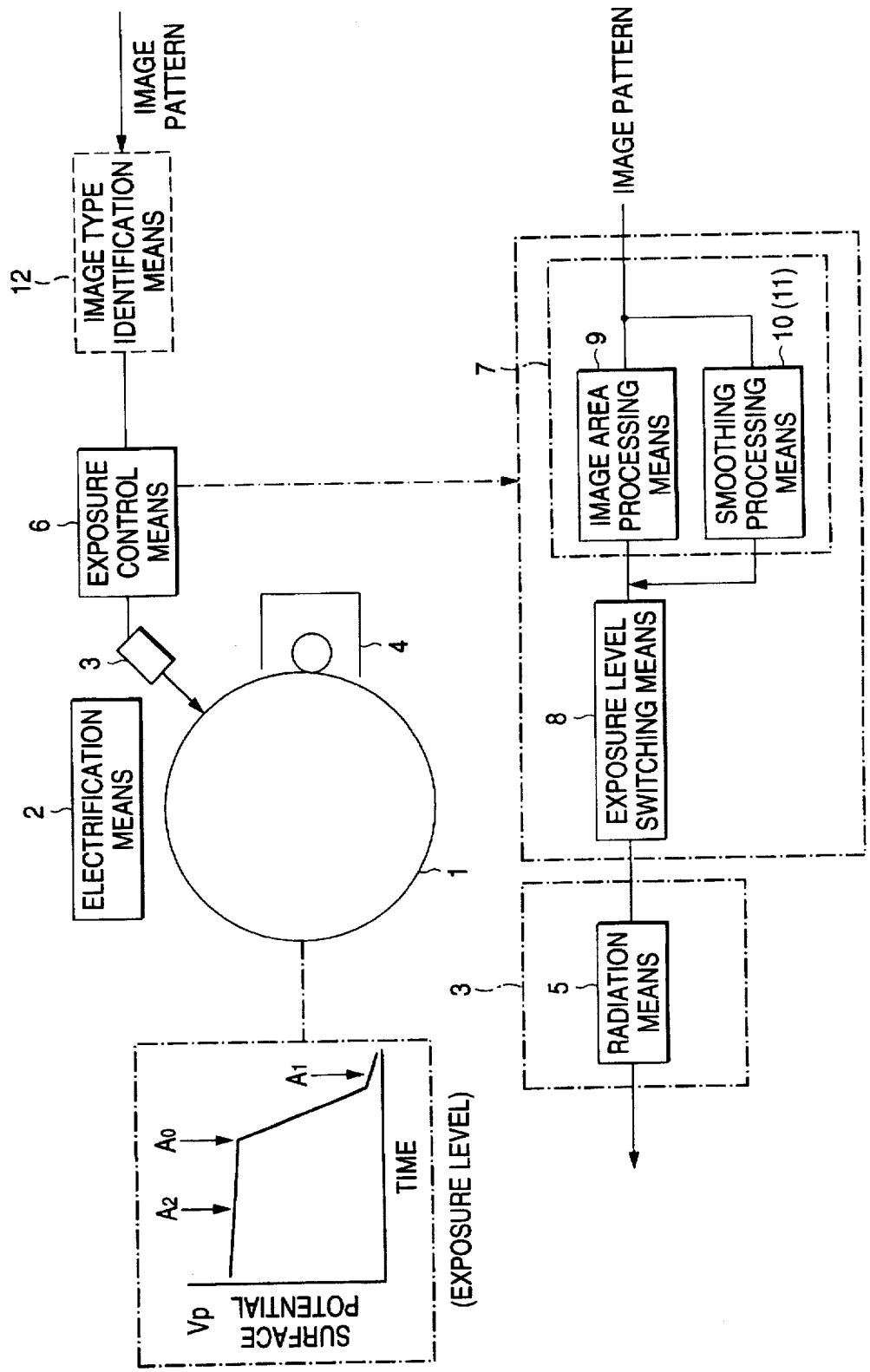

IMAGE FORMING APPARATUS WITH EXPOSURE CONTROL HAVING A SMOOTHING FUNCTION

BACKGROUND OF THE INVENTION

1. Field of the Invention

The present invention relates to an image forming apparatus such as a copier, an electrostatic recording apparatus, a facsimile, a transmitter, or a laser printer that forms an image on a photosensitive body using electrophotography. More particularly, the present invention relates to an improved image forming apparatus that uses a photosensitive body possessing so-called High-$\gamma$ characteristics.

2. Description of the Related Art

The electrophotography features speedy image formation, dry development, and high recording density. At present, the electrophotography is practically utilized in the form of an image forming apparatus, such as an ordinary paper copier, a laser printer, or a facsimile, taking full advantage of the above-described characteristics. Electrophotographic processes consist of basic processes: namely, electrification, exposure, development, transfer, fixing, and cleaning processes. A photosensitive body is an important part that is used in forming a latent image during the electrification and exposure processes of the above-described electrophotographic processes.

Desired characteristics of a photosensitive body for electrophotography are electrostatic-charging characteristics and photoconductive characteristics. The formation of a latent image in the electrophotographic processes predominantly depends on these characteristics. In the electrophotography, an image is formed by uniformly electrifying the surface of the photosensitive body and by selectively discharging the surface of the photosensitive body with the aid of radiation.

The following four materials can be chiefly mentioned as representative photosensitive bodies for electrophotography purposes that have already been in actual use: namely;

(1) amorphous-chalcogenide-based materials including amorphous-selenium and alloys thereof, (2) inorganic compound base materials (groups II–IV elements) such as zinc oxide and cadmium sulfide, (3) organic photoconductors (OPC) such as resin-dispersion-material base macro-molecular and low-molecular organic compounds, and (4) amorphous silicon based materials.

Inorganic materials have been predominant over the photosensitive bodies by the 1970s. However, as a result of emergence of OPCs in the first half of the 1970s, the photosensitive bodies for electrophotography purposes experienced drastic replacement. In other words, market demand shifted in the direction in which the majority of conventional inorganic photosensitive bodies were replaced with OPCs.

The OPC features easy design of spectral sensitivity, and therefore there arises a new demand for OPC as a result of emergence of a laser printer. This is attributable to the facts that the majority of recording light sources are a semiconductor laser, and that the photosensitive body has superior sensitivity with respect to monochrome light at a wavelength of 780 nm.

The reason why these factors become dominant in the electrophotography will be described below.

The electrophotography has already been in actual use only in the form of an ordinary paper copier that uses an analog light system as the light source. In the 1980s, this technology has found widespread applications as an output device of a computer. In addition, the technology of digital imaging and color copying with use of ordinary paper rapidly developed. Such a system uses a digital optical system, and hence the photosensitive body is required to have sufficient sensitivity with respect to the light source used in that system. In short, it becomes important for the photosensitive body to have sufficient sensitivity with respect to monochromatic light having a specific wavelength. Semiconductor lasers are widely used as the digital light source. For this reason, the majority of the photosensitive bodies were developed so as to become inexpensive, superiorly massproducible, and greatly sensitive with respect to monochromatic light having a peak value between 700 to 900 nm. Eventually, the OPCs dominate the photosensitive bodies for use with an electrophotographic system that uses a digital optical system.

The OPC currently being ranked as the dominant photosensitive body is a laminate OPC consisting of a charge transfer layer which is made by dissolving a high concentration of a charge transfer agent into resin, and a charge generation layer which is made by dispersing a high concentration of charge generation pigment into resin.

In the OPC of this type, the basic function of the photosensitive body, that is, photoconductivity, is independently separated, which in turn results in extended range of choices of materials. Consequently, the performance of the photosensitive body is remarkably improved. Particularly, organic photosensitive bodies that use phtalocyanine pigment such as metal-free phtalocyanine, copper phtalocyanine, titanyl phtalocyanine, magnesium phtalocyanine, or vanadyl phtalocyanine are known as being suitable for with a digital optical system.

A large problem of this laminate OPC is that it is negatively charged. Specifically, a system that uses a negative-charge OPC generates a large amount of osone. To prevent this problem, research on the development of a positive-charge OPC began, as disclosed in, e.g., the reports entitled "(1) Japan Hardcopy '88, T. Nakagawa et al. and (2) Japan Hardcopy '88, I. Ozawa et al." The positive-charge OPC were put into practical use in the form of an OPC for use with an ordinary paper copier in the latter half of the 1980s.

Research on the development of a positive-charge single layer OPC also began, and an OPC possessing new characteristics was proposed, as disclosed in, e.g., the reports entitled "(1) IS&T's Seventh International Congress Advances in Non-impact Printing Technologies, S. Johnson et al., '91, and (2) ditto, S. Tsuchiya et al., '91."

The above-described OPCs are photosensitive bodies that do not include the charge transfer agent dissolved into the photosensitive layer but include the pigment dispersed into resin. These OPCs are inexpensive when compared with the conventional laminate OPC in terms of the formation of layers.

These OPCs are mainly characterized by positive charges.

High-$\gamma$ characteristics can be also mentioned as another principal characteristic of these photosensitive bodies. The High-$\gamma$ characteristics lie in a large gradient of a linear attenuation portion of a potential attenuation curve of the photosensitive body. It has been put forward that these characteristics are particularly desirable in forming an image using a digital method.

The optical energy of the spot beam used in a conventional dot exposure operation has a Gaussian distribution having a symmetrical decaying portion with respect to the peak. A photosensitive body, in which potential attenuation begins according to the amount of incoming light, is exposed to a spot beam having the Gaussian distribution so as to form an image. As a result, the dot-shaped radiation having the symmetrical decaying portion with respect to the peak thereof is directly reproduced, and the periphery of a resultant dot becomes blurred. Eventually, a dot image with low resolution is formed.

To prevent this problem, a so-called High-γ photosensitive body is disclosed in, e.g., Unexamined Japanese Patent Application No. Hei-1-169454. In this photosensitive body, no substantial potential attenuation arises at the time of weak exposure, but a sharp potential attenuation characteristic appears when the amount of light is increased to a certain extent. This publication has descriptions related to the formation of a sharp dot-shaped latent image even in the case where the dot-shaped radiation has the Gaussian distribution.

The occurrence of High-γ characteristics in the single layer OPC has been known as an induction effect. The induction effect is a phenomenon in which a time lag occurs before an electric potential attenuate after the photosensitive body has been exposed to light. This induction effect is characteristic of a resin-dispersed photosensitive body. It is supposed that this phenomenon takes place as a result of the transfer of carries in the following manner. Namely, the carriers occurred in an initial stage of the exposure are captured by traps, and therefore the carriers do not much contribute to the potential attenuation. Subsequently, the traps are filled with the carries as the number of carriers increase. Then, the transfer of carriers suddenly takes place, which in turn brings about large potential attenuation. Consequently, a high gamma value is read.

It has been conceived that the induction effect is not suitable for obtaining linear photosensitive characteristics. Therefore, the reduction of induction effect has been studied. However, as previously described, there arises a tendency to digitally form an image (or to create an image in a binary coded form) by actively utilizing the induction effect (i.e., the fact that a surface potential of a photosensitive body mildly attenuate, at the outset, as a result of the photosensitive body being electrified and exposed with an increase in the exposure value but sharply attenuate later as the exposure value is increased).

In recent years, a laser beam printer has come into wide use as an output device of a personal computer. A laser beam printer having a print density of, e.g., 300 dpi, is inexpensive and, therefore, is becoming increasingly common. Further, an engine of the printer is designed to provide a high print density such that higher quality printed output is produced. As a result, printers having a print density of 600 dpi or more are now commercially available.

Where the dot information prepared by a personal computer in a print density of 300 dpi is printed in a high density of 600 dpi by the engine, the size of characters will change, or jaggies on the enlarged characters will become noticeable. Thus, the advantage of high density printing cannot be obtained. To prevent the jaggies, several types of smoothing technology have been put forward.

For example, Unexamined Japanese Patent Application No. Sho 53-411115 discloses the technology for converting the monochromatic state of small pixels after the conversion of a resolution by the result of a logic operation of target pixels and their surrounding pixels at the time of the resolution conversion.

Further, Unexamined Japanese Patent Application No. Hei-2-112966 discloses the technology for carrying out smoothing treatment by matching the pattern of image data obtained from a character generator of the printer with known patterns.

If such smoothing processing is unconditionally carried out, problems sometimes arise.

Specifically, where the image data comprise character areas and image areas, and where the image areas are subjected to smoothing treatment, the gradation of the image areas will be impaired, which in turn results in poor picture quality. To prevent this problem, the following technique has been put forward in order to prevent the image portions from undergoing smoothing treatment.

For example, Unexamined Japanese Patent Application No. Hei 4-189564 discloses the technology of activating or deactivating a smoothing function on the basis of start/end addresses of image areas which are memorized on the basis of the data fed from a host computer. Further, Unexamined Japanese Patent Application No. Hei-4-268867 discloses the technology of deactivating a smoothing function with respect to the area consisting of dense pixels by obtaining the degree of concentration of pixels for each predetermined block of the image data.

It is impossible to apply a single layer photosensitive body having High-γ characteristics that is inexpensive in terms of formation of a layer and is dominantly characterized by positive charges which bring about a smaller amount of osone, to electrophotographic processes. It is also impossible to directly apply the conventional smoothing technology to the case where an image is digitally formed in low print density.

More specifically, analog is the concept underlying the development of the above-described smoothing technology. This smoothing technology is based on the principle that the amount of incoming light is proportional to attenuation of the potential of an electrostatic charge and the density of a developed image, as a result of the exposure of the charged photosensitive body to light.

In other words, the potential of the electric charge attenuate according to the amount of an incoming laser beam at the time of exposure, and a pixel density corresponding to the attenuation is obtained. Therefore, in the prior art, the pixels to be smoothed are subjected to smoothing treatment on the basis of the assumption that the print state of pixel is controlled by adjusting the exposure value.

In contrast, the potential of the single layer photosensitive body having High-γ characteristics gradually attenuate in a gentle manner with respect to the amount of incoming light. The potential begins to sharply fall at the time when an exposure value exceeds a certain extent. Therefore, it is impossible to proportionally attenuate the potential of the electrostatic charge with respect to the amount of an incoming laser beam, which in turn makes it difficult to control the printed state of each pixel.

Therefore, it is difficult to directly apply the conventional smoothing technology to a photosensitive body that performs the above-described on/off actions.

SUMMARY OF THE INVENTION

The present invention has been conceived to solve the foregoing drawbacks in the prior art. The object of the present invention is to provide an image forming apparatus capable of effectively smoothing characters or a line image which consists of a fine line and producing a superior line image without jaggies when a photosensitive body having High-γ characteristics is applied to electrophotographic processes.

As shown in FIG. 1, the present invention provides an image forming apparatus that uses a photosensitive body 1 having potential attenuation characteristics in which the potential VP of a uniformly charged surface of the photosensitive body sharply drops at the time when an exposure value exceeds a certain value A0; that writes a latent image corresponding to an image pattern on the photosensitive body 1 electrified by charging means 2 by exposure the photosensitive body 1 to a beam using exposure means 3; aid that forms a visible image from the latent image using development means 4, the image forming apparatus being characterized by the fact that

- the exposure means 3 is provided with radiation means 5 whose exposure value is variably set and which is capable of blinking on a pixel-by-pixel basis;
- exposure control means 6 for controlling the exposure means 3 is provided with exposure pattern determination means 7 that determines an exposure pattern according to the image pattern, and exposure value switching means 8 that switches between an exposure value A1 at which the potential of the photosensitive body 1 sharply attenuate and an exposure value A2 at which the potential of the photosensitive body 1 does not substantially attenuate, depending on the exposure pattern determined by the exposure pattern determination means 7; and
- the exposure pattern determination means 7 is provided with image area processing means 9 that exposes black pixels which form an image area of the image pattern to an intensive light having the exposure value A1 at which the potential of the photosensitive body 1 sharply attenuate, and smoothing processing means 10 that extracts at least white pixels being adjacent to the black pixels and being locally recessed with respect to surrounding black pixels from among all the white pixels which form a background of the image pattern as well as exposes the thus-extracted white pixels to a weak beam having the exposure value A2 at which the potential of the photosensitive body 1 does not substantially attenuate.

According to another aspect of the present invention, there is provided an image forming apparatus comprising a photosensitive body 1, electrifying means 2, exposure means 3, and development means 4, the improvement being characterized by the fact that

- the exposure means 3 is provided with the previously-described radiation means 5;
- the exposure control means 6 for controlling the exposure means 3 is provided with the exposure pattern determination means 7 and the exposure value switching means 8; and
- the exposure pattern determination means 7 is provided with the image area processing means 9 that exposes black pixels which form an image area of the image pattern to an intensive beam having the exposure value A1 at which the potential of the photosensitive body 1 sharply attenuate, and smoothing processing means 11 that exposes at least white pixels being adjacent to the black pixels from among all the white pixels which form a background of the image pattern to a weak beam having the exposure value A2 at which the potential of the photosensitive body 1 does not substantially attenuate.

In the above-described technological means, all of the photosensitive bodies can be used as the photosensitive body 1 so long as they have the potential attenuation characteristics in which the surface potential of the photosensitive body 1 sharply drops at the time when the exposure level exceeds the certain exposure level A0. For example, a single layer positive-charge organic photosensitive body consisting of X-type metal-free phtalocyanin and a binder resin can be mentioned as the photosensitive body 1. The shape of the photosensitive body 1 is not limited to a drum shape or a belt shape.

It is only necessary for the image forming apparatus of the present invention to make the toner image on the photosensitive body 1 visible by means of the charging means 2, the exposure means 3, and the development means 4. Further, the image forming apparatus may be arranged so as to directly transfer a toner image formed on the photosensitive body 1 onto a recording medium. The present invention comprises various types of image forming apparatus: for example, an image forming apparatus that primarily transfers the toner image on the photosensitive body 1 to an intermediate transfer material and, then, secondarily transfers the toner image from the intermediate transfer material to the recording medium.

It is only necessary for the exposure means 3 to be provided with the irradiation means 5, such as a laser and an LED, whose exposure level is variably set and which is capable of blinking on a pixel-by-pixel basis. The design of an optical system that guides the beam originated from the irradiation means 5 to the photosensitive body 1 may be changed, as required.

The diameter of the beam irradiated to the photosensitive body 1 from the irradiation means 5 should preferably be set so as to become larger than at least the diameter of the pixel when the photosensitive body is exposed to the beam at the exposure level A1. An exposure level of an overlapping area between the area of the beam that lies off the edge of the pixel exposed to the intensive beam at the exposure level A1 and the area exposed to the weak beam at the exposure level A2 should preferably be set so as to become substantially equivalent to the exposure level A1.

Any algorithm may be selected as the algorithm of the smoothing means 10 of the exposure pattern determination means 7, so long as it is capable of extracting at least white pixels being adjacent to the black pixels and being locally recessed with respect to surrounding black pixels, as pixels to be smoothed, from among all the white pixels which form a background of the image pattern. For example, algorithm which extracts a pixel of interest as a pixel to be smoothed may be used on the basis of the positional relationship between black pixels which form an image area and white pixels which form a background area of all the pixels constituting the image pattern, on condition that the pixel of interest is a white pixel, and that a pixel being diagonally opposite to the pixel of interest and adjacent pixels are black pixels.

It is only necessary for the smoothing processing means 11 of the second aspect of the invention to expose at least the white pixels being adjacent to the black pixels from among all the white pixels which form the background of the image pattern, to the weak beam at the exposure level A2. In terms of further simplification of the processing, it is desirable to expose all the white pixels other than the black pixels to the weak beam at the exposure level A2.

The smoothing processing means 10 and 11 should preferably be activated with regard to characters or line images such as fine lines. If a line image is input as an image pattern by means of mode selection means, the smoothing processing means 10 and 11 should preferably be activated in a selective manner.

Instead of the mode selection means, the image forming apparatus should preferably be provided with the image type identification means 12 that distinguishes the line image area from the image area of the image pattern. The smoothing processing means 10 and 11 may be arranged so as to smooth the line image area identified by the image type identification means 12.

In the above-described technological means, the photosensitive body 1 has the potential attenuation characteristics in which the potential VP of the uniformly charged surface sharply drops at the time when the exposure level exceeds the certain exposure level A0.

In the image forming apparatus having the above-described photosensitive body 1, the image type identification means 12 distinguishes a line image area from an image area of an image pattern during the passage of the image pattern through the image type identification means 12. The image type identification means 12 sends the exposure pattern determination means 7 of the exposure control means 6 for smoothing only the line image area identified together with the image pattern.

For brevity, provided that the image pattern is a line image, the image area processing means 9 of the exposure pattern determination means 7 of the first aspect of the invention exposes the black pixels that form the image area of the image pattern to the beam at the exposure level A1 at which the potential of the photosensitive body 1 sharply attenuate.

In contrast, the smoothing means 10 of the exposure pattern determination means 7 uses predetermined algorithm: for example, it extracts at least a pixel of interest as a pixel to be smoothed on the basis of the positional relationship between black pixels which form an image area and white pixels which form a background area of all the pixels constituting the image pattern, on condition that the pixel of interest is a white pixel, and that a pixel being diagonally opposite to the pixel of interest and adjacent pixels are black pixels. The thus-extracted pixel to be processed is exposed to the beam at the exposure level A2 at which the potential of the photosensitive body 1 does not substantially attenuate.

In the second aspect of the present invention, the image area processing means 9 performs the same processing as it does in the first embodiment. In contrast, the smoothing processing means 11 exposes at least the white pixels being adjacent to the black pixels from among all the white pixels which form the background of the image pattern, to the weak beam at the exposure level A2.

After the exposure pattern has been determined in the above-described manner, exposure pattern information is input to the exposure level switching means 8. Then, the exposure level switching means 8 switches between an exposure value A1 at which the potential of the photosensitive body 1 sharply attenuate and an exposure value A2 at which the potential of the photosensitive body 1 does not substantially attenuate, depending on the exposure pattern 7.

As a result, the radiation means 5 exposes the black pixels which form the image area to the intensive beam at the exposure level A1, as shown in FIG. 2A. In contrast, the radiation means 5 exposes the white pixels to be smoothed by the smoothing means 10 and 11 to the weak beam at the exposure level A2.

If the diameter of the beam radiated to the photosensitive body 1 from the radiation means 5 is selected, as required, the edge of the intensive beam that is radiated to the black pixel at the exposure level A1 and has the Gaussian distribution lies off the pixel to be exposed, as shown in FIGS. 2A and 2B. In contrast, if the white pixel that is adjacent to the black pixels and is to be smoothed is exposed to the weak beam at the exposure level A2, the intensive beam that lies off the edge of the pixel to be exposed overlaps the weak beam having the exposure level A2. The exposure level of the area that is exposed in an overlapped manner is designated by a phantom line in FIG. 2B. The exposure level of the overlapping area is increased so as to become substantially the same as the exposure level A1 of the intensive beam.

In this state, the potential of some of the white pixels that are adjacent to the black pixels and are to be smoothed attenuate to the level designated by a chain line shown in FIG. 2B at which the image pattern can be developed. Then, the image pattern is developed by the development means 4 and is smoothed.

The above and other objects and features of the present invention will be more apparent from the following description taken in conjunction with the accompanying drawings.

BRIEF DESCRIPTION OF THE DRAWINGS

FIG. 1 is a schematic diagram showing the configuration of an image forming apparatus according to the present invention;

FIGS. 4A and 4B are plots, wherein FIG. 4A shows the bright attenuation characteristics of a photosensitive drum used in the first embodiment, and FIG. 4B shows the dark attenuation characteristics of the photosensitive drum used in the first embodiment;

FIGS. 9A to 9D are charts that show comparison patterns of a pattern determination section used in the first embodiment;

DETAILED DESCRIPTION OF THE PREFERRED EMBODIMENTS

Now, a description will be given in more detail of preferred embodiments of the present invention with reference to the accompanying drawings.

(First Embodiment)

Figure 2A:
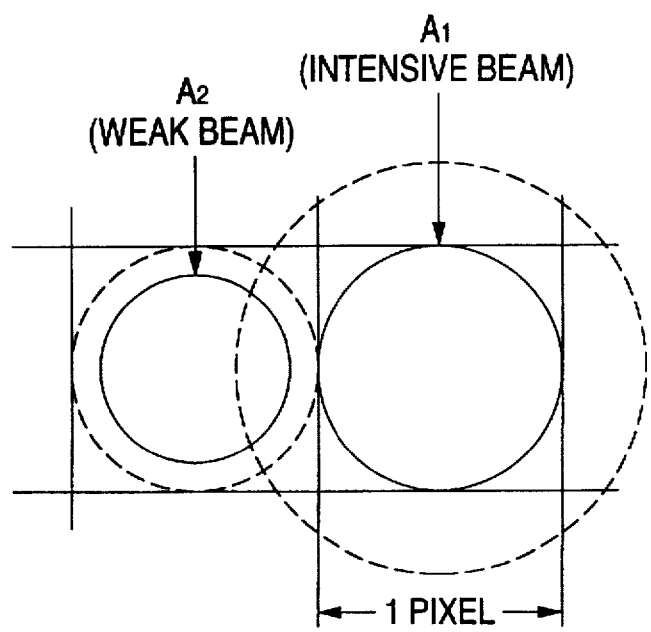
FIGS. 2A and 2B are diagrammatic representations for describing the principle of smoothing treatment carried out in the image forming apparatus of the present invention.
Figure 2B:
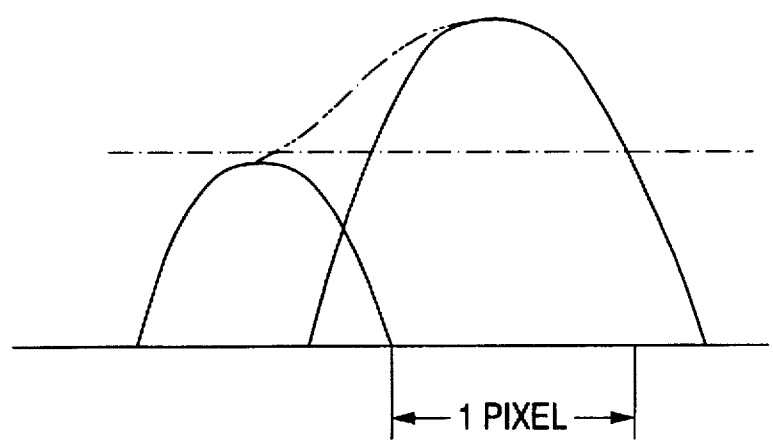
Figure 3:
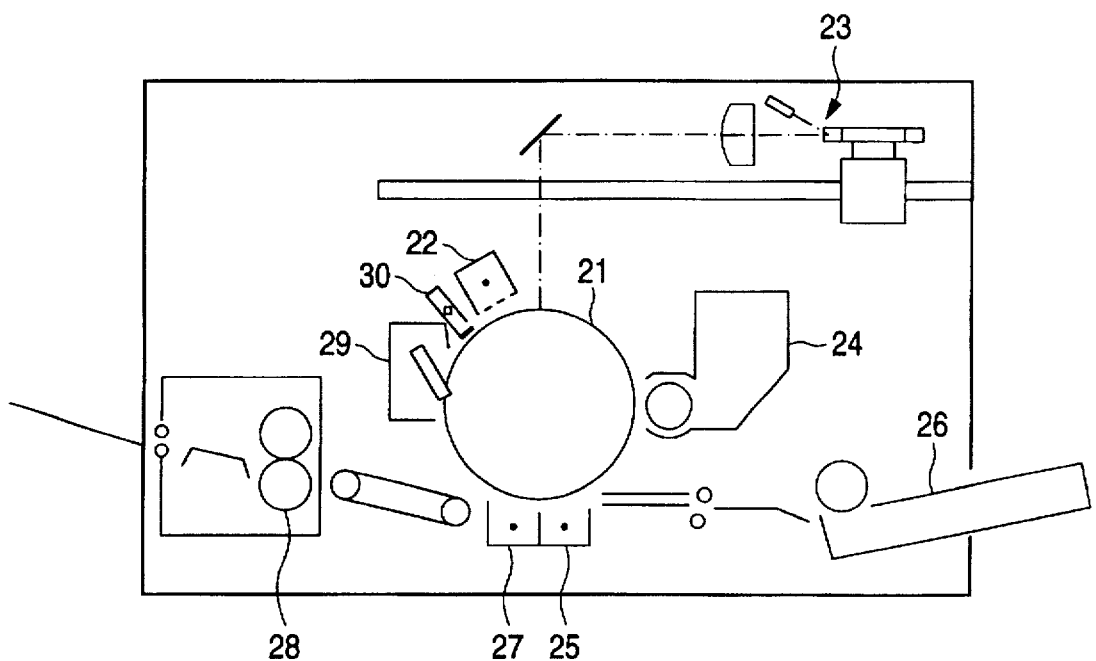
FIG. 3 is a schematic representation of the outline of an image forming apparatus according to a first embodiment of the present invention.

FIG. 3 shows an image forming apparatus according to a first embodiment of the present invention.

In the drawing, reference numeral 21 designates a single layer organic photosensitive body that has the potential attenuation characteristics (High-γ characteristics) in which the potential of the photosensitive body sharply drops at the time when an exposure level is in excess of a certain level. Reference numeral 22 designates an electrification unit which positively electrifies the photosensitive body 21. Reference numeral 23 designates an optical writer (an exposure device) that forms an electrostatic latent image (a negative latent image for use in exposing an image area in the present embodiment). For example, a laser beam generator housing a semiconductor laser and a polygon mirror is used as the optical writer.

Reference numeral 24 designates a developing device that makes the latent image formed on the photosensitive body 21 visible with the use of toner having charges which are the same as the charged photosensitive body 21 in polarity. Reference numeral 25 designates a transfer unit, such as a corotron, that transfers the toner image on the photosensitive body 21 to recording paper 26. Reference numeral 27 designates a paper separator, such as a corotron, that peels the recording paper 26 electrostatically adhered to the photosensitive body 21. Reference numeral 28 designates a fixing device that fixes an unfixed toner image on the recording paper 26. Reference numeral 29 designates a cleaner that removes residual materials, such as a residual toner, on the photosensitive body 21. Reference numeral 30 is a discharger for removing residual electric charges from the surface of the photosensitive body 21.

In the present embodiment, a single layer organic photosensitive body that consists of X-type metal-free phtalocyanin dispersed into a binder resin is used as the photosensitive body 21.

Specifically, a prototype of a single layer positive-charge photosensitive body was manufactured from sensitive materials, i.e., X-type metal-free phtalocyanin (manufactured by Dainippon Ink Inc.) and Fastgen Blue. The details of these photosensitive bodies are already disclosed in Unexamined Japanese Patent Application No. Hei 3-287171.

In the embodiment, the photosensitive body is formed into a drum shape using an aluminum drum main body.

The charge on a hole is transferred in the single layer photosensitive body 21 having the previously-described structure, and hence the surface of the photosensitive body 21 is positively charged when in use.

Figure 4A:
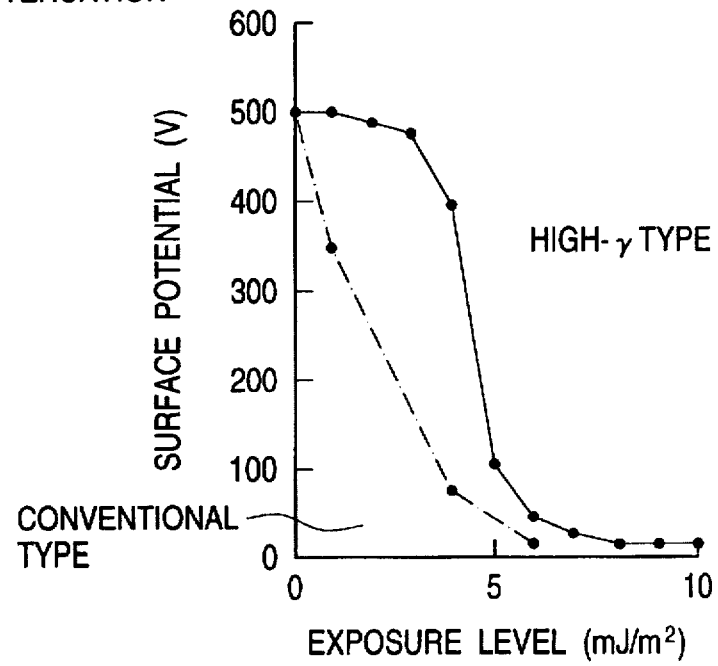
Figure 4B:
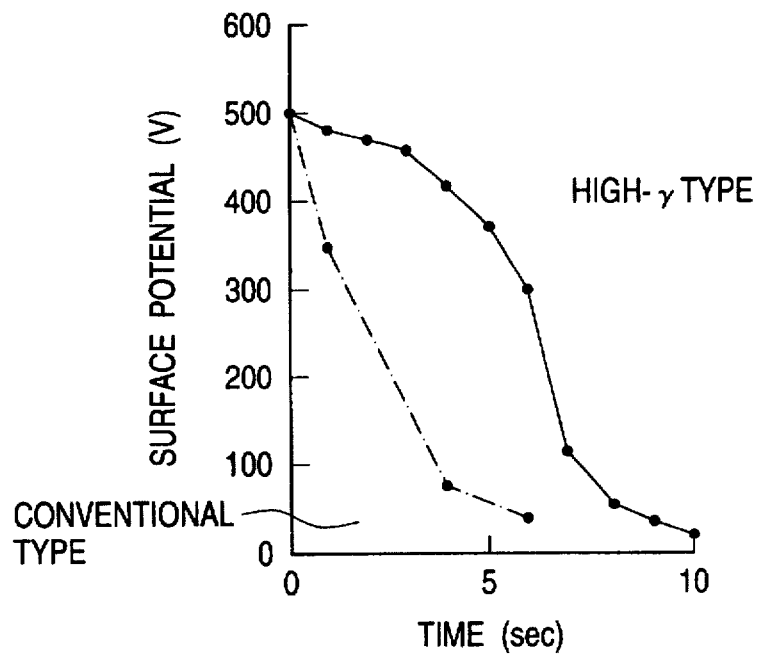

FIGS. 4A and 4B show the potential attenuation characteristics of the resin-dispersed single layer photosensitive body 21.

The solid line shown in FIG. 4A designates the bright attenuation characteristics of the resin-dispersed single layer photosensitive body 21. After having been charged, the resin-dispersed single layer photosensitive body 21 is exposed to a beam. The potential of the surface of the resin-dispersed single layer photosensitive body 21 gradually and mildly attenuate at the outset by exposure. The surface potential sharply attenuate after the gentle attenuation curve as the exposure level is increased further.

In contrast, the solid line shown in FIG. 4B designates the dark attenuation characteristics of the resin-dispersed single layer photosensitive body 21. After the resin-dispersed single layer photosensitive body 21 has been charged to a predetermined potential, the surface potential of the resin-dispersed single layer photosensitive body 21 mildly attenuate over time at the outset. Subsequently, the surface potential of the resin-dispersed single layer photosensitive body 21 sharply drops with lapse of time.

The bright and dark attenuation characteristics (designated by a dot line in FIGS. 4A and 4B) of a conventional laminated photosensitive body are compared with those of the resin-dispersed single layer photosensitive body 21 used in the present embodiment. The surface of the laminated photosensitive body is negatively charged, whereas the surface of the resin-dispersed single layer photosensitive body 21 are positively charged. For this reason, the absolute values of the surface potential of the laminated photosensitive body shown in FIGS. 4A and 4B are used.

As can be seen from FIGS. 4A and 4B, substantially all of the sensitive areas of the conventional laminated photosensitive body reacted with the radiation in terms of the sensitivity characteristics. In contrast, even if the single layer photosensitive body of the present embodiment has been exposed to a certain exposure level, the surface potential of the photosensitive body mildly attenuate. When the exposure level is increased so as to exceed a certain level, the surface potential sharply attenuate.

A single layer photosensitive body that consists of zinc oxide dispersed into resin and an organic photosensitive body that consists of phtalocyanin dispersed into resin have also been reported to have on-and-off switchable sensitivity characteristics as well as S-shaped inflection points in the bright and dark attenuation characteristics. However, these materials are not suitable for practical use for the following reasons: namely, it takes a long relaxation time during which the surface potential of the photosensitive body starts to attenuate as a result of exposure; a lot of charge is required to electrify the photosensitive body; and the potential retaining performance and sensitivity significantly change as a result of repetitive use of the photosensitive body.

For these reasons, a single layer sensitive material that consists of X-type metal-free phtalocyanin dispersed in resin is used as a photosensitive body which has practical sensitivity characteristics as well as solves the above-described problems, in the present embodiment.

Figure 5:
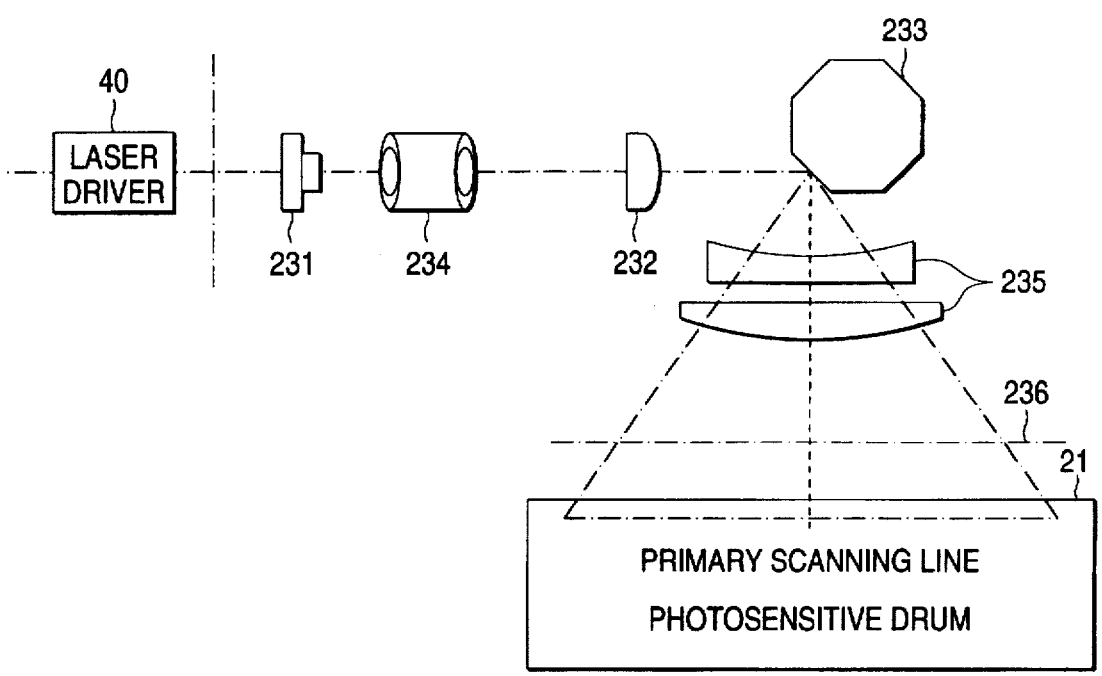
FIG. 5 is a schematic representation that shows the details of an exposure unit used in the first embodiment.

FIG. 5 shows the details of the optical writer 23 used in the present embodiment.

Figure 6:
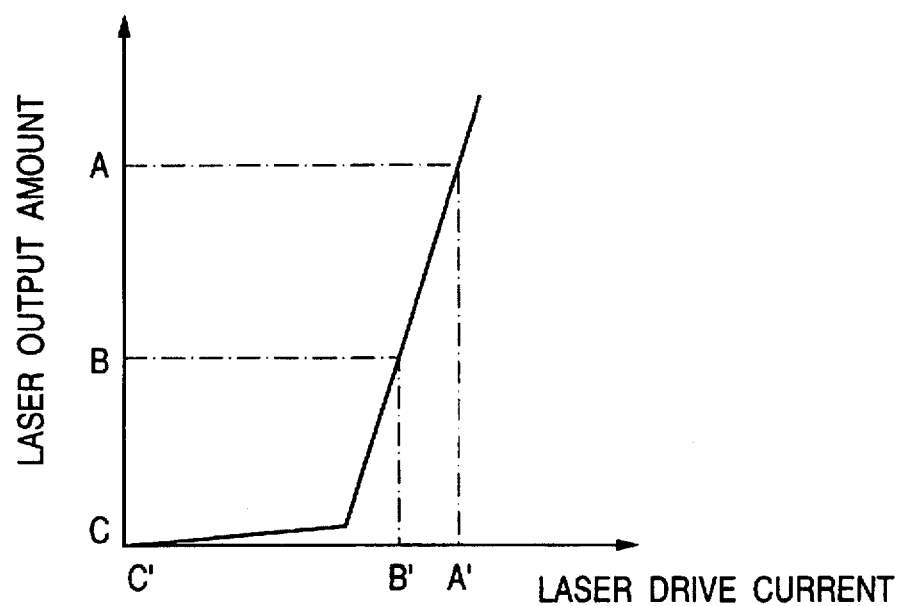
FIG. 6 is a plot that shows the characteristics of a laser used in the first embodiment.

In the drawing, reference numeral 231 designates a semiconductor laser capable of blinking on a pixel-by-pixel basis, and this semiconductor laser has the output characteristics (i.e., the laser output light quantity characteristics with respect to a laser drive current output from a laser driver 40) that permit variable setting of exposure level, as shown in FIG. 6.

Further, reference numeral 232 designates a collimator lens for collimating the beam originated from a laser 231; 233 designates a polygon mirror for deflecting the beam passed through the collimator lens 232 in the primary scanning direction of the photosensitive drum 21; 234 designates a cylindrical mirror for correcting a tilt of the polygon mirror 233; 235 designates an f-θ lens (i.e., an imaging lens) for converging the beam deflected in the primary scanning direction by the polygon mirror 233 into an image on the photosensitive drum 21; and 236 designates a mirror for introducing the beam passed through the f-θ lens 235 to the photosensitive drum 21.

Figure 7:
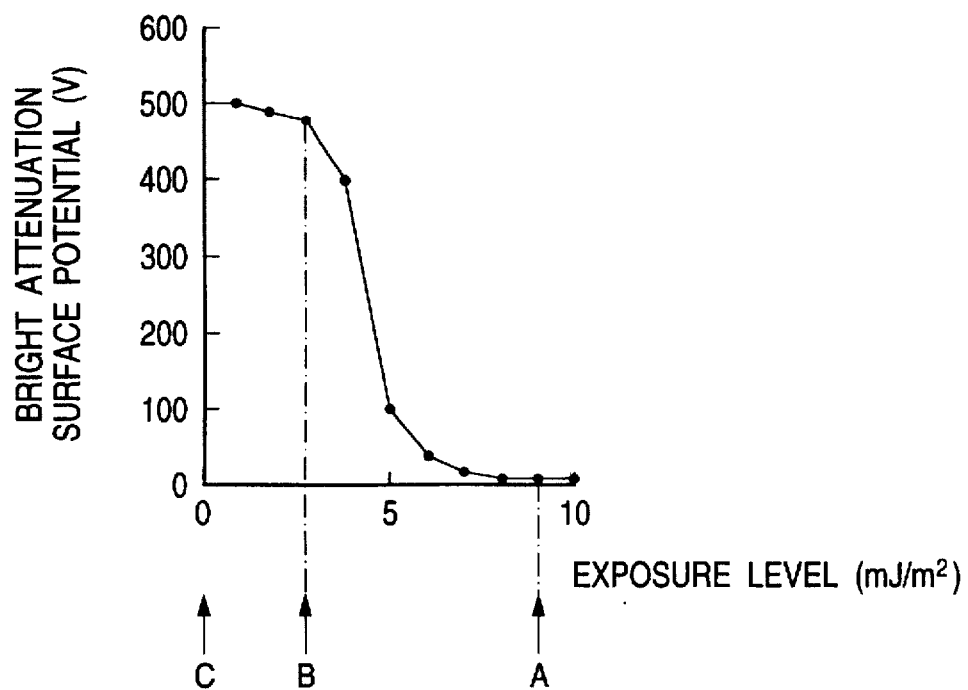
FIG. 7 is a plot that shows the way the laser employed in the first embodiment is used.

The laser driver 40 of the present embodiment drives the semiconductor laser 231 so as to blink on a pixel-by-pixel basis. With respect to the black pixels that form an image area, the laser driver 40 blinks the semiconductor laser 231 using a laser drive current A', as shown in FIGS. 6 and 7. As a result, the photosensitive drum 21 is exposed to an intensive beam at an exposure level A at which the potential of the photosensitive drum 21 sharply attenuate. In contrast, with respect to the pixels that are determined to undergo smoothing treatment by means of an algorithm which will be described later, the laser driver 40 blinks the semiconductor laser 231 using a laser drive current B', as shown in FIGS. 6 and 7. As a result, the photosensitive drum 21 is exposed to a weak beam at an exposure level B at which the potential of the photosensitive drum does not substantially attenuate. Further, with respect to the white pixels that form a background of the image data, the semiconductor laser 231 is turned off (i.e., an exposure level C=0) using a laser drive current C' (which is 0A in the present embodiment), as shown in FIGS. 6 and 7.

Figure 8:
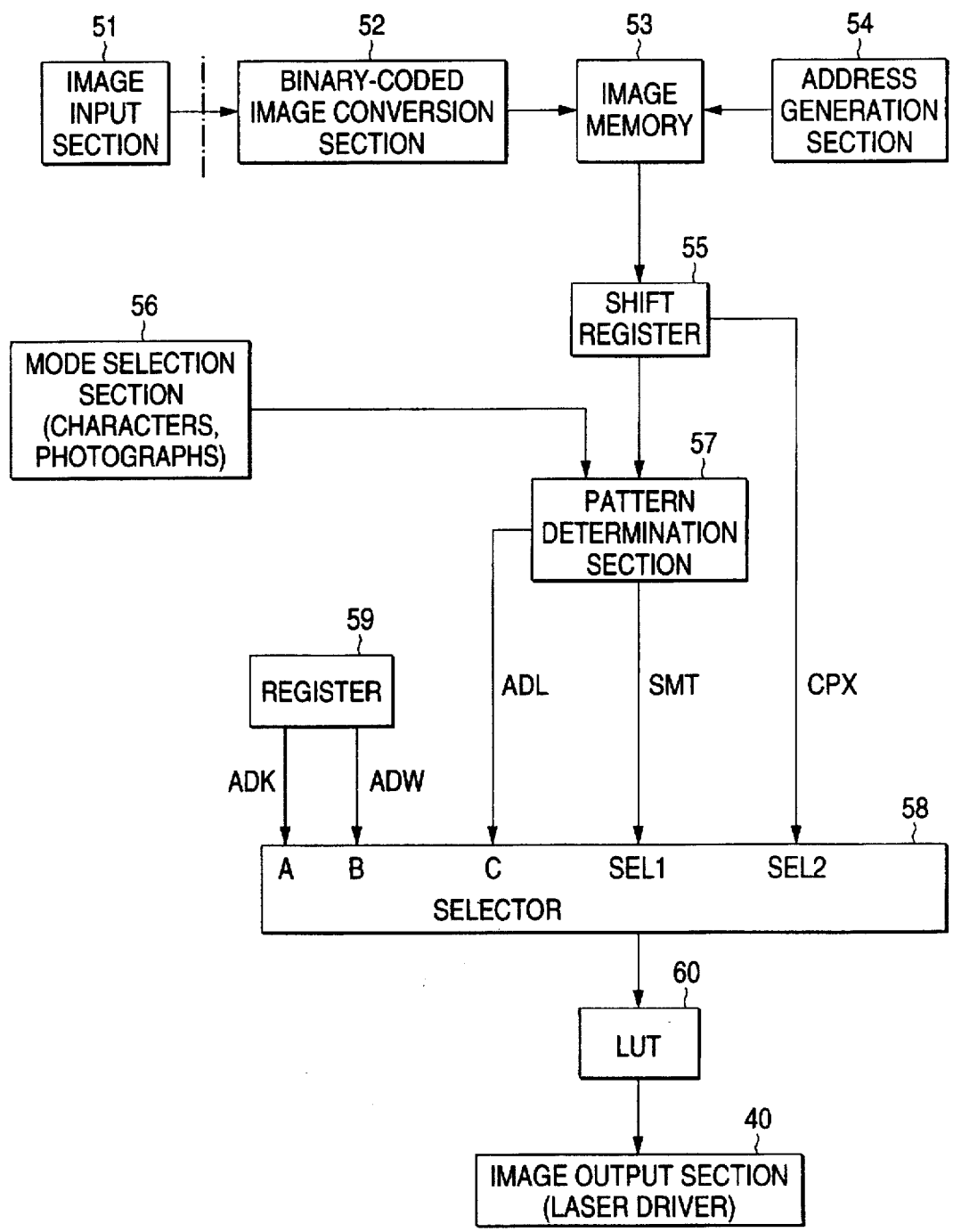
FIG. 8 is a block diagram that shows a specific example of an exposure controller used in the first embodiment.

FIG. 8 shows the details of an exposure controller used in the present embodiment.

In the drawing, reference numeral 51 designates an image input section, such as an image scanner, which reads an original and outputs image data.

Reference numeral 52 designates a binary-coded image conversion section that converts the thus-output image data into binary-coded image data. In the binary-coded image data, a black pixel is designated by "one", and a white pixel is designated by "zero".

Reference numeral 53 designates image memory that holds the thus-converted binary-coded image data.

Reference numeral 54 designates an address generation section that outputs an address signal according to which the binary-coded image data in the image memory 53 are sequentially accessed in the primary scanning direction every 1-by-5 matrix of pixels, that is, a matrix with "one" pixel in the primary scanning direction and "five" pixels in the secondary scanning direction. Consequently, the binary-coded image data are sequentially read from the image memory 53.

Reference numeral 55 designates a shift register that stores the binary image data of 5-by-5 matrix of pixels, that is, a matrix with "five" pixels in the primary scanning direction and "five" pixels in the secondary scanning direction. Upon receipt of one set of binary-coded image data from the image memory 53, the shift register 55 stores the thus-received image data into "five" registers located along one end in the primary scanning direction. Further, the shift register 55 shifts the contents of the other registers in the primary scanning direction. Resultantly overflowed data are discarded. Eventually, the binary-coded image data of the reference area (the five-by-five matrix of pixels in the present embodiment) are stored in the shift register 55. The pixel at the center of the reference area, that is, the value of the pixel of interest, is output as pixel-of-interest data CPX.

Reference numeral 56 is a mode selection section for selecting either a character mode or a photographic mode.

Reference numeral 57 designates a pattern determination section that is activated only when the character mode is selected. Therefore, the pattern determination section 57 does not operate in the photographic mode. Specifically, the pattern determination section 57 does not output an address signal AD which will be described later, and a pattern match signal SMT is reduced to zero.

The pattern determination section 57 compares a dot pattern of the reference area stored in the shift register 55 with various types of pattern condition. A dot is generated with respect to the pixel of interest, which will be described later, on the basis of the matched patterns (which will be hereinafter referred to as determination pattern conditions).

FIGS. 9A to 9D show the above-described various types of pattern condition of the present embodiment.

In the drawings, an asterisk * designates a pixel of interest; a black circle ● designates a pixel which forms an image; a white circle ○ designates a pixel which does not form an image; and a horizontal bar − designates a pixel which is specified neither to form or not to form an image.

On the basis of the surrounding pixels, it is initially determined which of several patterns of positional relationship agrees with the positional relationship between the pixel of interest and the corner of the surrounding pixels, with reference to FIGS. 9A to 9D. If this condition is satisfied, a dot is generated in the pixel of interest. As a result, jaggies on slanting lines of a line image are smoothed.

Figures 9A, 9B, 9C, 9D:
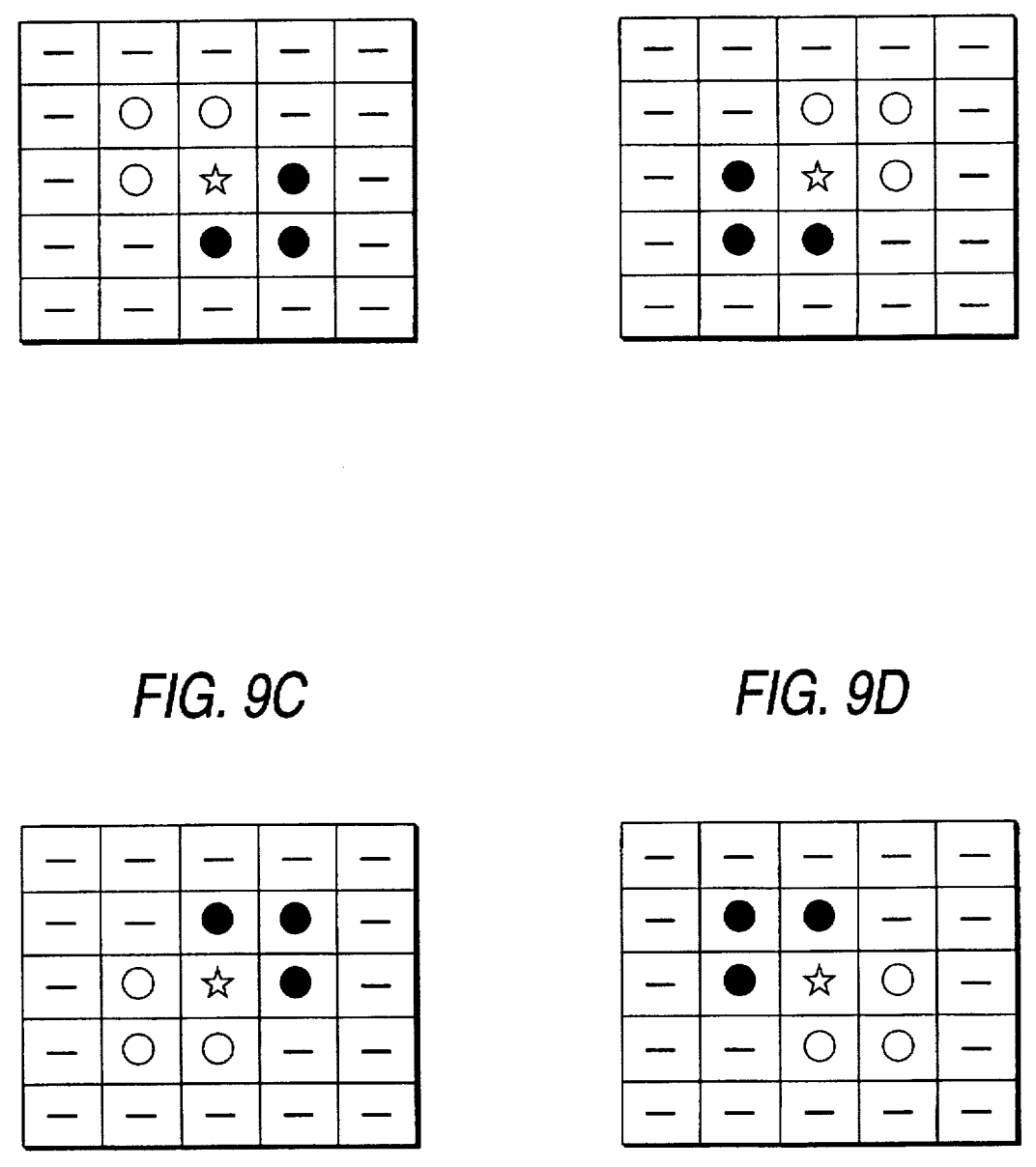

With reference to, e.g., an example shown in FIG. 9A, the above-described processing will be described. The pattern of pixels around the pixel of interest satisfies the pattern condition, shown in FIG. 9A, that white pixels which do not form an image and black pixels which form an image surround the pixel of target. In this case, if the pixel of interest is a white pixel, it is decided that this pattern of pixels is one of several types of pattern condition for generating a small dot in the position of the pixel of interest.

Specifically, the pattern determination section 57 compares a dot pattern of the reference area stored in the shift register 55 with various types of pattern condition. The pattern determination section 57 outputs an address signal ADL on the basis of the matched patterns (which will be hereinafter referred to as a determination pattern condition). This address signal ADL specifies a read address of a look-up table (LUT) 60. Provided that the address signal ADL is directly fed to the look-up table 60, image data corresponding to black pixels that satisfy the determination pattern condition are output from the look-up table 60.

The pattern determination section 57 outputs a pattern match signal SMT on the basis of the determination pattern condition. This pattern match signal SMT will become "one" if the determination pattern condition is effective. At all other times, the pattern match signal SMT becomes "zero."

If the dot pattern of the reference area does not satisfy any one of the pattern conditions, the address signal ADL will not be output, and the pattern match signal SMT becomes "zero."

Reference numeral 58 designates a selector that receives signals SMT and CPX through selector input terminals SELL and 2. The selector 58 selects a signal from the address signals ADK, ADW, and ADL fed to data input terminals A–C, in response to the received signal. The thus-selected signal is output from an output terminal OUT.

An address signal ADK regarding a totally black pattern in the look-up table 60 is fed to the data input terminal A from a register 59. Similarly, an address signal ADW regarding a totally white pattern in the look-up table 60 is fed to the data input terminal B from the register 59.

The operation of the exposure controller of the present embodiment will now be described.

First, the image data received from the image input section 51 are converted into binary-coded image data via the binary-coded image conversion section 52. The thus-converted binary-coded image are stored in the image memory 53.

Next, the address generation section 54 sequentially reads a set of binary-coded image data (i.e., a one-by-five matrix of pixels, or a pixel with "one" pixel in the primary scanning section and "five" pixels in the secondary scanning direction) from the image memory 53. The thus-read binary-coded image data are stored in the shift register 55 while the contents of the shift register are shifted.

Subsequently, when the mode selection section 56 selects the character mode, the pattern determination section 57 determines which of the pattern conditions is satisfied by the reference area stored in the shift register 55.

If the dot pattern of the reference area does not any of the pattern conditions, the pattern match signal SMT will become "zero", and a dot will not be generated in the pixel of interest. In consequence, an image which is not subjected to smoothing treatment is output.

More specifically, the address signals ADK and ADW are fed to the look-up table 60 via the selector 58. The look-up table 60 outputs image data associated with the pixels, and the thus-output image data are fed to the image output section 40 (corresponding to a laser driver).

In contrast, if the dot pattern of the reference area satisfies any one of the pattern conditions, the address signal ADL will be fed to the look-up table 60 via the selector 58. The image data associated with intermediate pixels (i.e., pixels to be smoothed) are output from the look-up table 60, and the smoothed image data are fed to the image output section 40 (corresponding to the laser driver).

Execution of the above-described processing is determined on the basis of the contents of the reference area stored in the shift register 55. The selected state of the selector 58 is accordingly changed every time binary-coded image data are newly read from the image memory 53, and every time the contents of the shift register 55 is updated.

The laser driver that acts as the laser driver drives the semiconductor laser 231 so as to blink, so that smoothing treatment is effected. In other words, the black pixels are exposed to an intensive beam at the exposure level A, whereas the intermediate pixels (i.e., the pixels to be smoothed) are exposed to a weak beam at the exposure level B.

If the semiconductor laser 231 effects such smoothing treatment, slanting lines of characters or line images such as fine lines are smoothed, which in turn prevents the edge of the line image from being jagged.

A simulation of 400 dots/inch resolution performed by the use of the image forming apparatus of the present embodiment will be described.

In this simulation, the radius of the laser beam in the primary scanning direction was set to 33 μm, and the radius of the same in the secondary scanning direction was changed to 33 μm, 39 μm, and 45 μm. The asterisks * shown in FIGS. 9A to 9E were exposed to the weak beam originated from the semiconductor laser while an exposure level I was changed from 0% to 25% of the intensive beam in 5% steps. Resultant dot matrices were evaluated.

Figure 10:
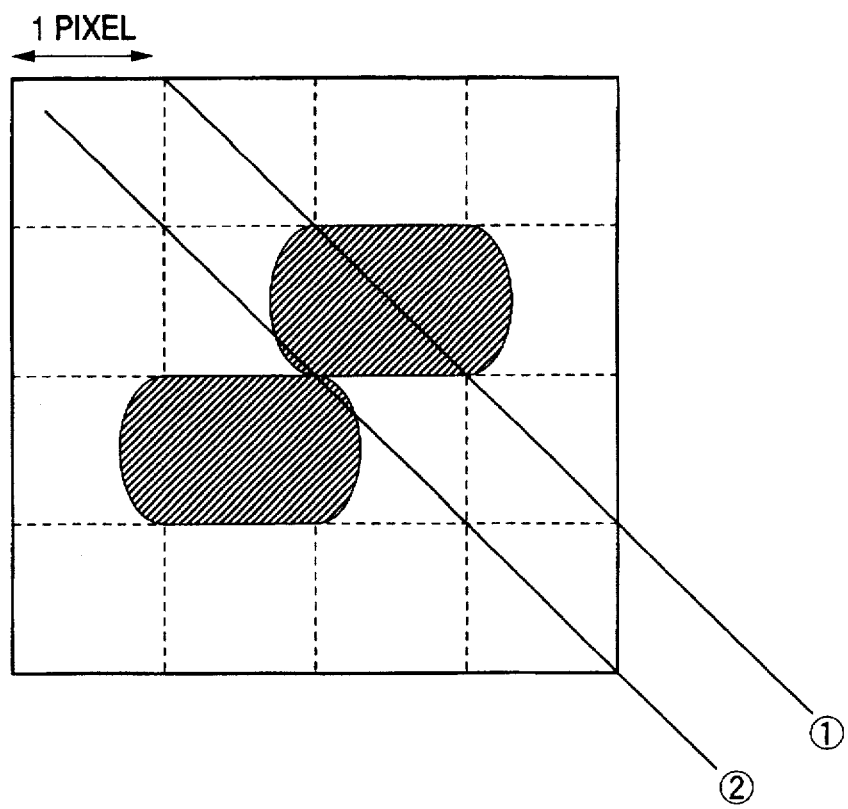
FIG. 10 is a schematic representation that shows the outline of a latent image formed as a result of the simulation performed in order to provide visual image of smoothing conditions in the first embodiment.
Figure 11:
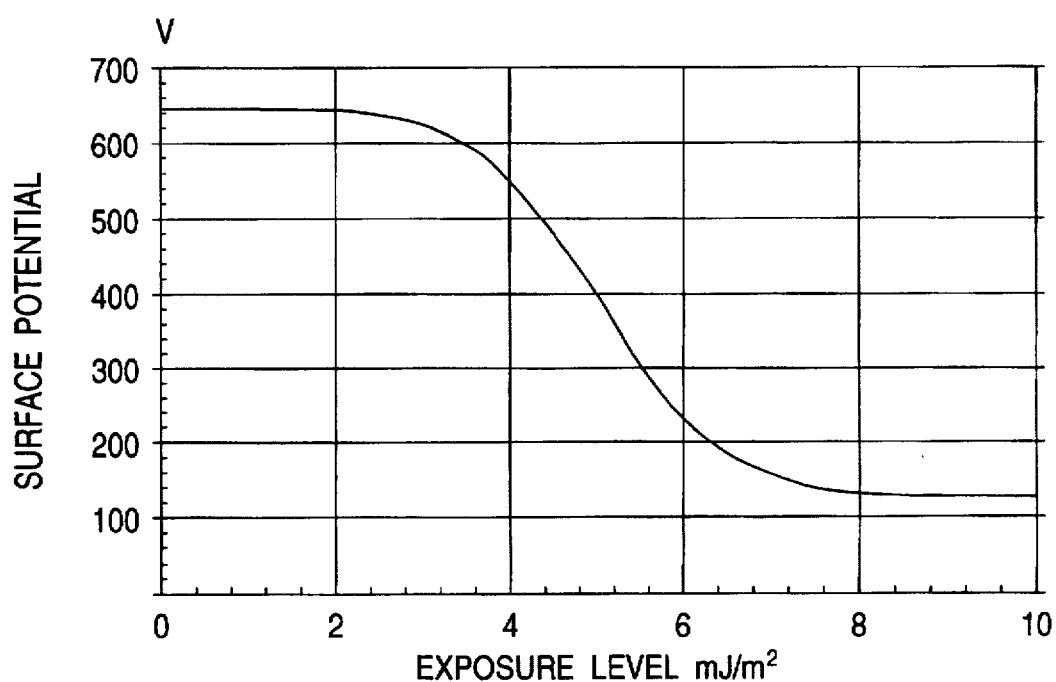
FIG. 11 is a plot that shows the sensitivity characteristics of a photosensitive body used in the simulation shown in FIG. 10.
Figure 12A:
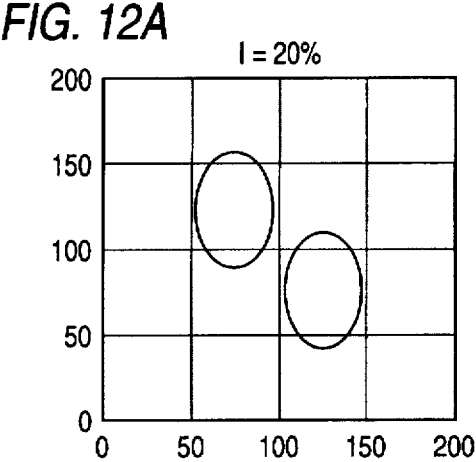
FIGS. 12A to 12F are plots of simulations in which images are formed using a circular laser having a radius of 33 μm while an exposure ratio I of a weak beam to an intensive beam is changed (0%, 5%, 10%, 15%, 20%, and 25%)
Figure 12B:
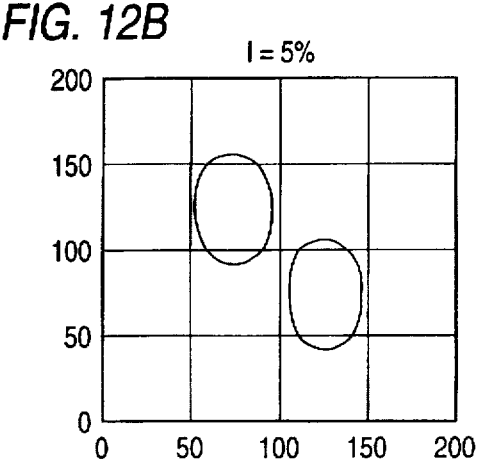
Figure 12C:
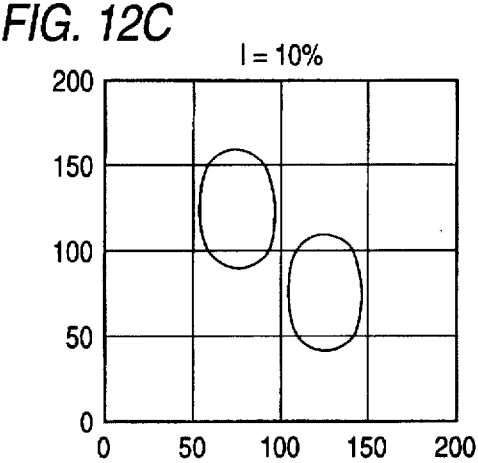
Figure 12D:
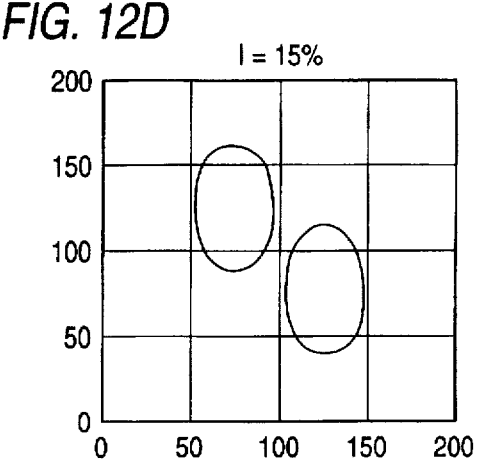
Figure 12E:
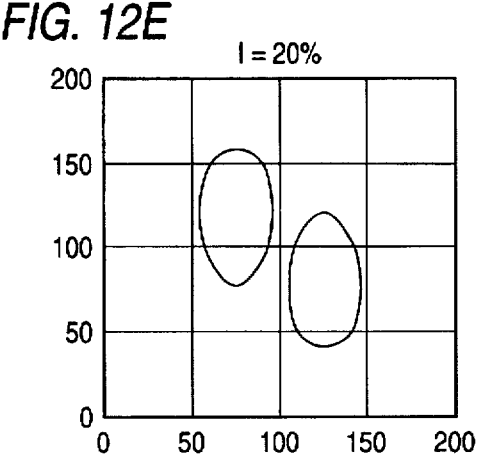
Figure 12F:
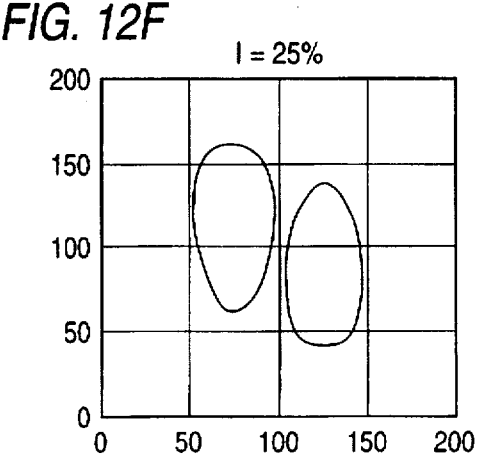

FIG. 10 is a diagrammatic representation of pixels that provides a top view of smoothing conditions of the present simulation. The surface of a photosensitive body having such a sensitivity curve as shown in FIG. 11 was charged to 650 v. The thus-charged surface is exposed to the beams having the above-described radii at a constant exposure level. FIG. 10 shows the states of the respective latent images obtained when an image potential was reduced to 120V and the outline of the latent images obtained when a development potential (i.e., a development bias) was reduced to 400V.

In FIG. 10, (1) designates a line across the center of (a pixel) forms a black circle ● at an angle of 45 degrees. (2) designates a line across a lattice point between pixels that form a diagonal pair of the black circles ● (black pixels) at an angle of 45 degrees.

FIGS. 12A to 20 show simulation results.

FIGS. 12A to 12F show simulations in which images were formed by use of a circular laser beam having a radius of 33 μm. These simulations were studied while an exposure ratio I of the weak beam to the intensive beam was changed (0%, 5%, 10%, 15%, 20%, and 25%).

Figure 13A:
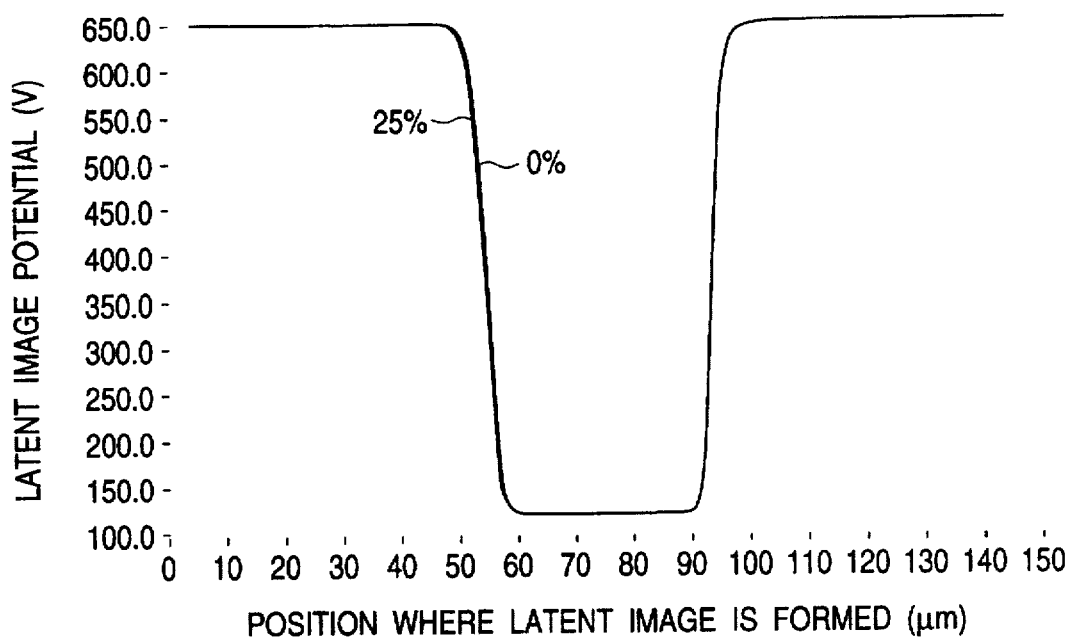
FIG. 13A is a plot that shows the cross section of latent images which are formed in the simulation shown in FIGS. 12A to 12F and are taken along a line (1) shown in FIG. 10.
Figure 13B:
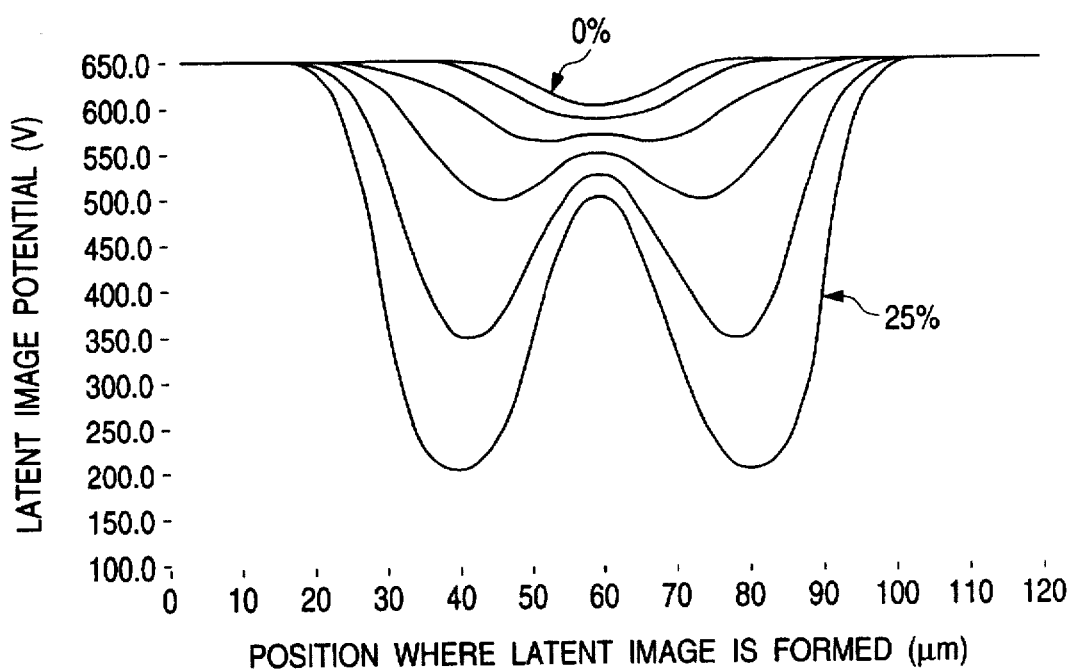
FIG. 13B is a plot that shows the cross section of latent images which are formed in the simulation shown in FIGS. 12A to 12F and are taken along a line (2) shown in FIG. 10.
Figure 14A:
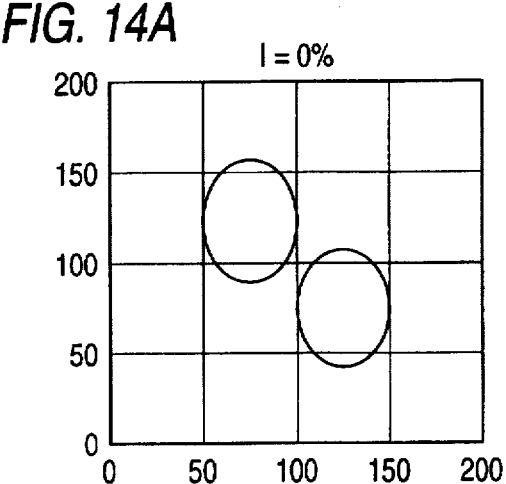
FIGS. 14A to 14F are plots of simulations in which images are formed using a circular laser having a shorter radius of 33 µm and a longer radius of 39 µm while the exposure ratio I of a weak beam to an intensive beam is changed (0%, 5%, 10%, 15%, 20%, and 25%)
Figure 14B:
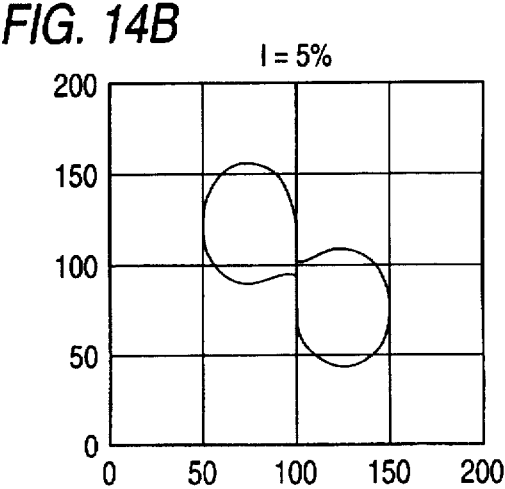
Figure 14C:
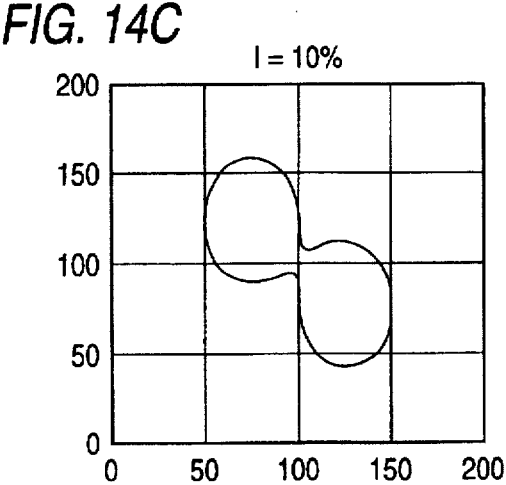
Figure 14D:
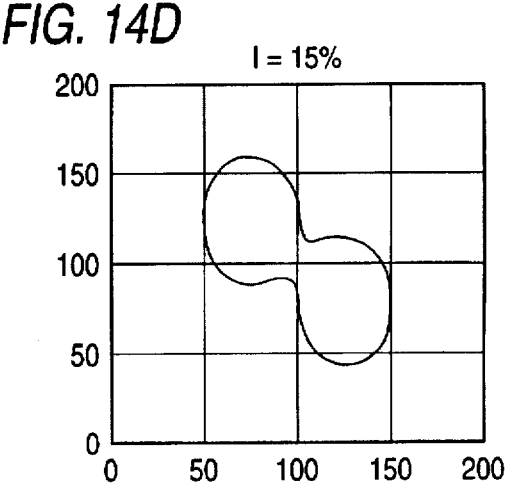
Figure 14E:
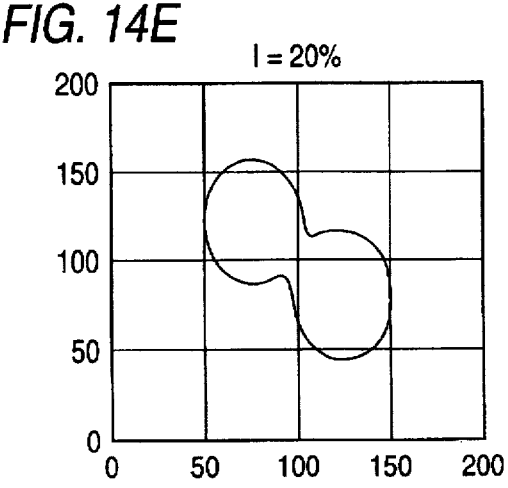
Figure 14F:
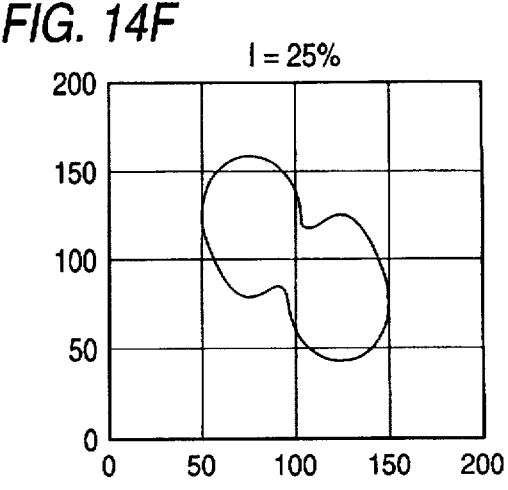

FIG. 13A shows the cross section of latent images obtained as a result of the simulations shown in FIGS. 12A to 12F using the line (1) shown in FIG. 10. FIG. 13B shows the cross section of the latent images obtained as a result of the simulations shown in FIGS. 12A to 12F using the line (2) shown in FIG. 10.

FIGS. 14A to 14F show simulations in which images were formed by use of an elliptical laser beam having a short radius of 33 µm and a long radius of 39 µm. These simulations were studied while an exposure ratio I of the weak beam to the intensive beam was changed (0%, 5%, 10%, 15%, 20%, and 25%).

Figure 15A:
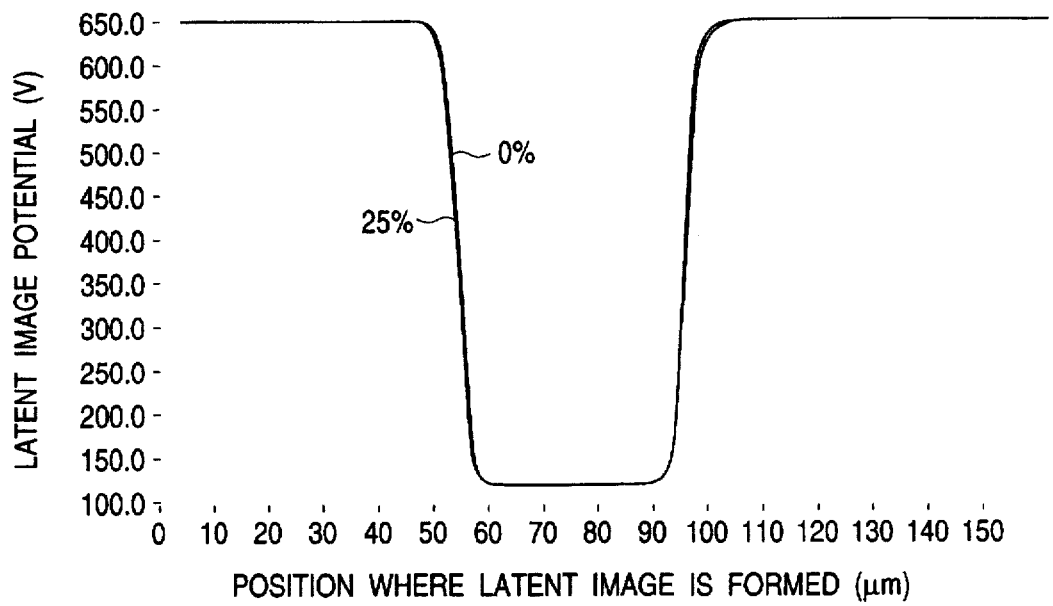
FIG. 15A is a plot that shows the cross section of latent images which are formed in the simulation shown in FIGS. 14A to 14F and are taken along the line (1) shown in FIG. 10.
Figure 15B:
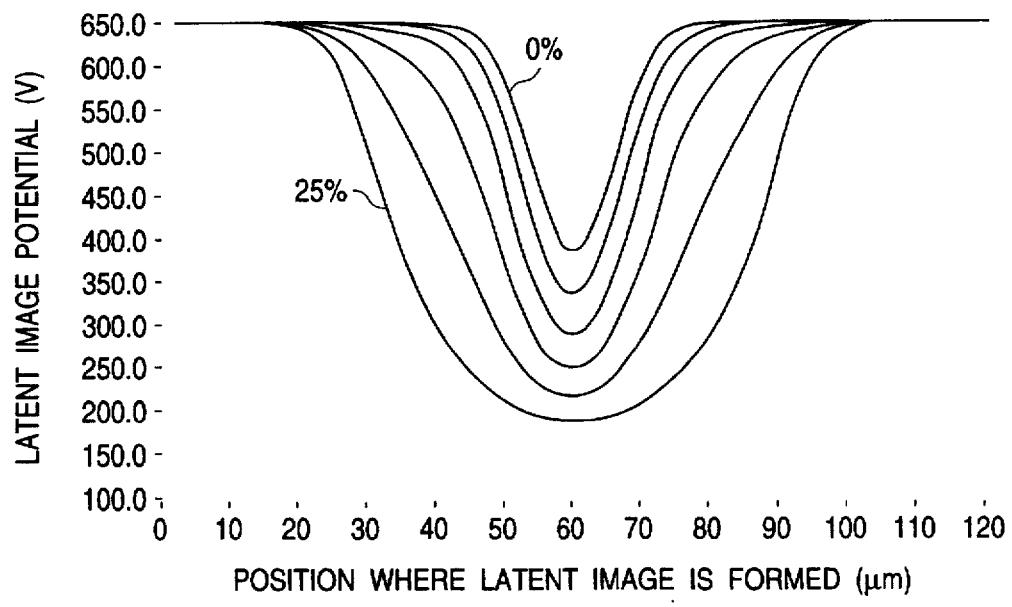
FIG. 15B is a plot that shows the cross section of latent images which are formed in the simulation shown in FIGS. 14A to 14F and are taken along the line (2) shown in FIG. 10.
Figure 16A:
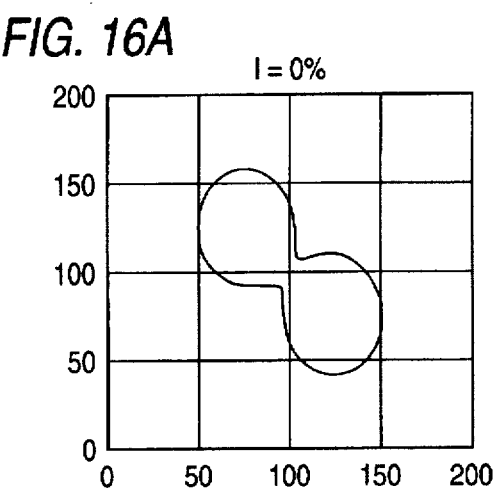
FIGS. 16A to 16F are plots of simulations in which images are formed using a circular laser having a shorter radius of 33 µm and a longer radius of 45 µm while the exposure ratio I of a weak beam to an intensive beam is changed (0%, 5%, 10%, 15%, 20%, and 25%)
Figure 16B:
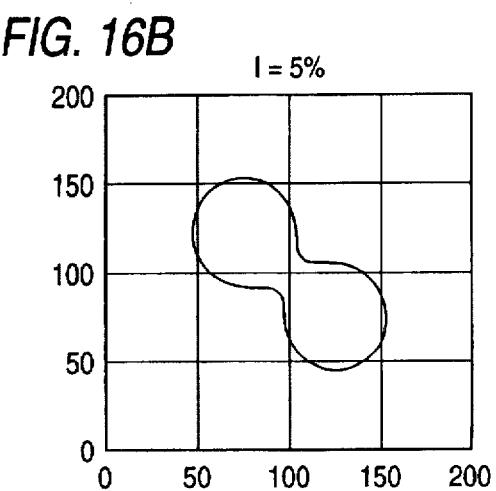
Figure 16C:
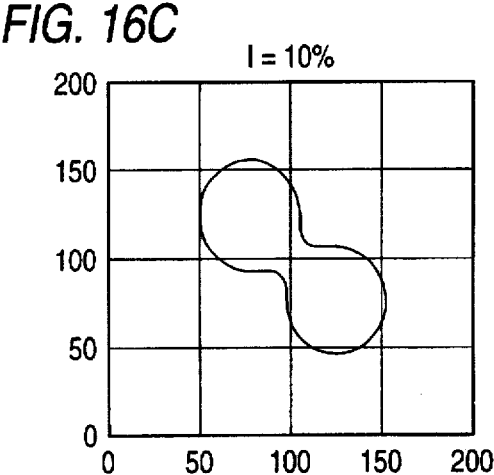
Figure 16D:
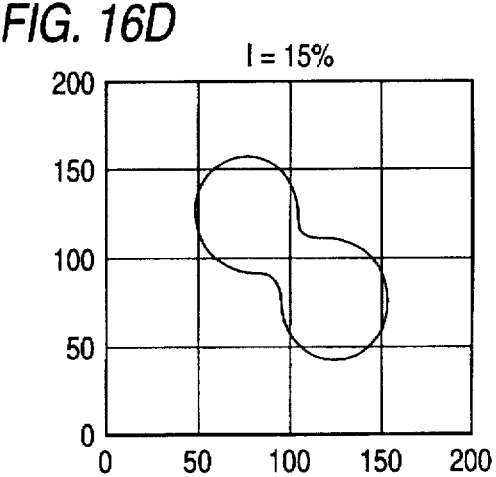
Figure 16E:
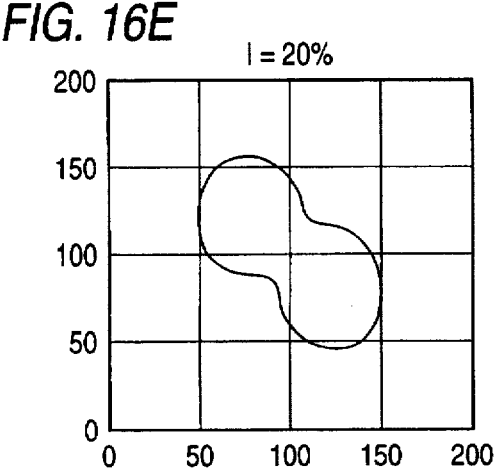
Figure 16F:
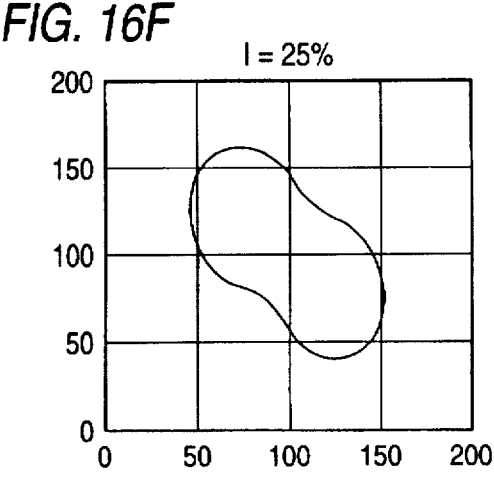

FIG. 15A shows the cross section of latent images obtained as a result of the simulations shown in FIGS. 14A to 14F using the line (1) shown in FIG. 10. FIG. 15B shows the cross section of the latent images obtained as a result of the simulations shown in FIGS. 14A to 14F using the line (2) shown in FIG. 10.

FIGS. 16A to 16F show simulations in which images were formed by use of an elliptical laser beam having a short radius of 33 µm and a long radius of 45 µm. These simulations were studied while an exposure ratio I of the weak beam to the intensive beam was changed (0%, 5%, 10%, 15%, 20%, and 25%).

Figure 17A:
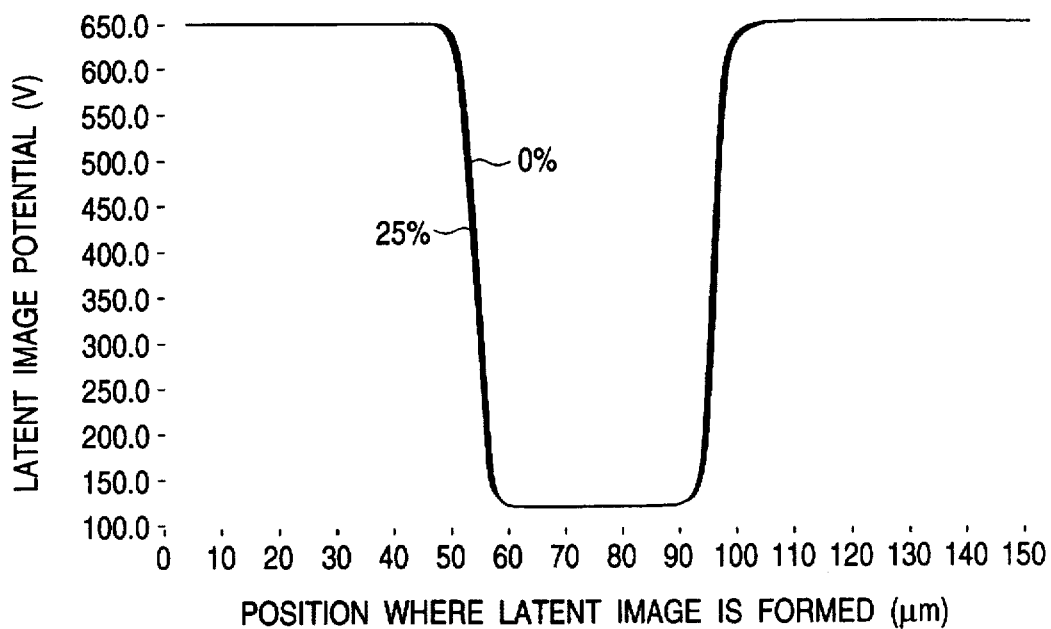
FIG. 17A is a plot that shows the cross section of latent images which are formed in the simulation shown in FIGS. 16A to 16F and are taken along the line (1) shown in FIG. 10.
Figure 17B:
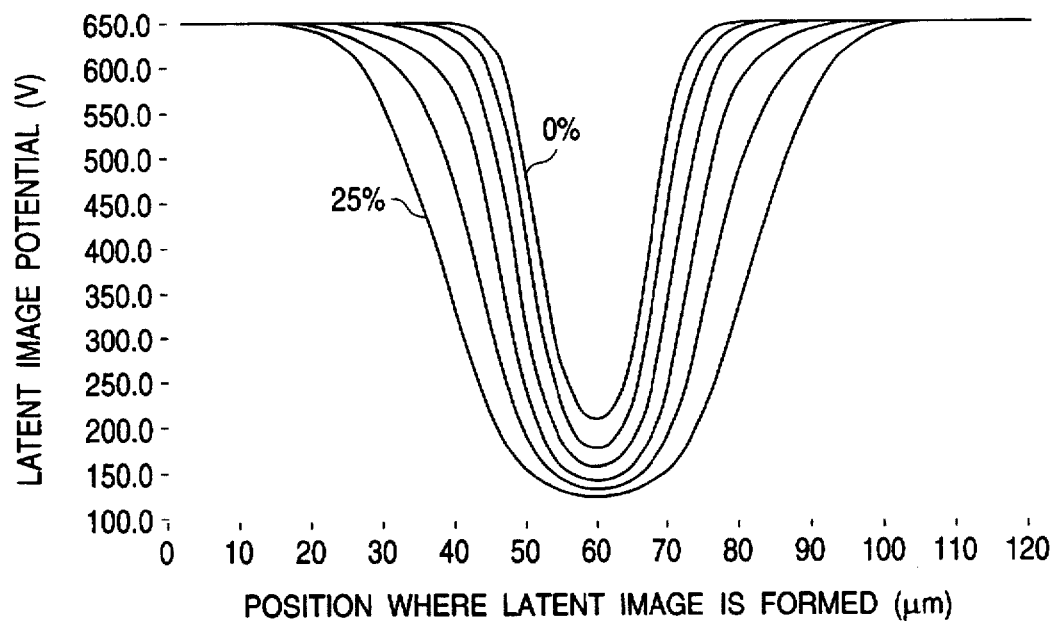
FIG. 17B is a plot that shows the cross section of latent images which are formed in the simulation shown in FIGS. 16A to 16F and are taken along the line (2) shown in FIG. 10.

FIG. 17A shows the cross section of latent images obtained as a result of the simulations shown in FIGS. 16A to 16F using the line (1) shown in FIG. 10. FIG. 15B shows the cross section of the latent images obtained as a result of the simulations shown in FIGS. 16A to 16F using the line (2) shown in FIG. 10.

Figure 18:
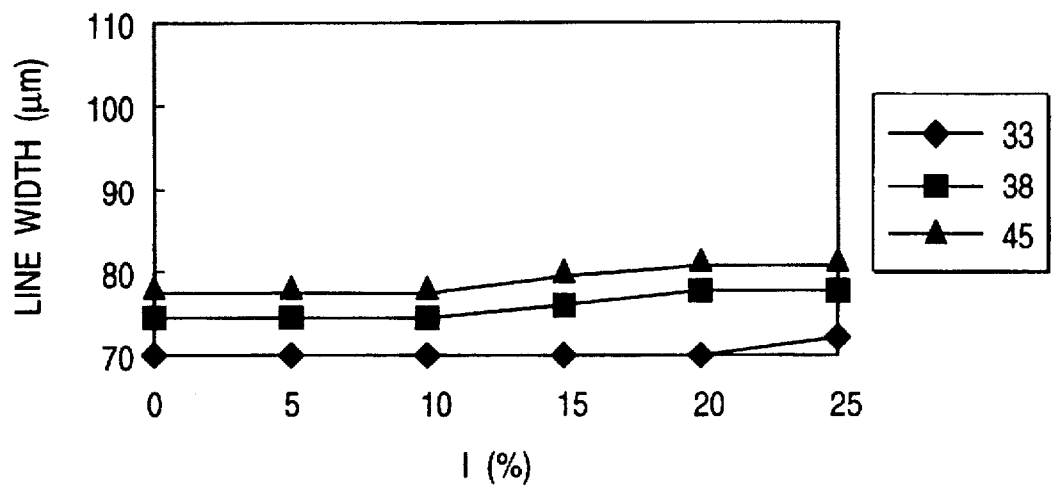
FIG. 18 is a plot that shows the relationship between the weak beam-to-intensive beam exposure ratio I and the width of the line (1) shown in FIG. 10 using the radius of the laser beam as a parameter.
Figure 19:
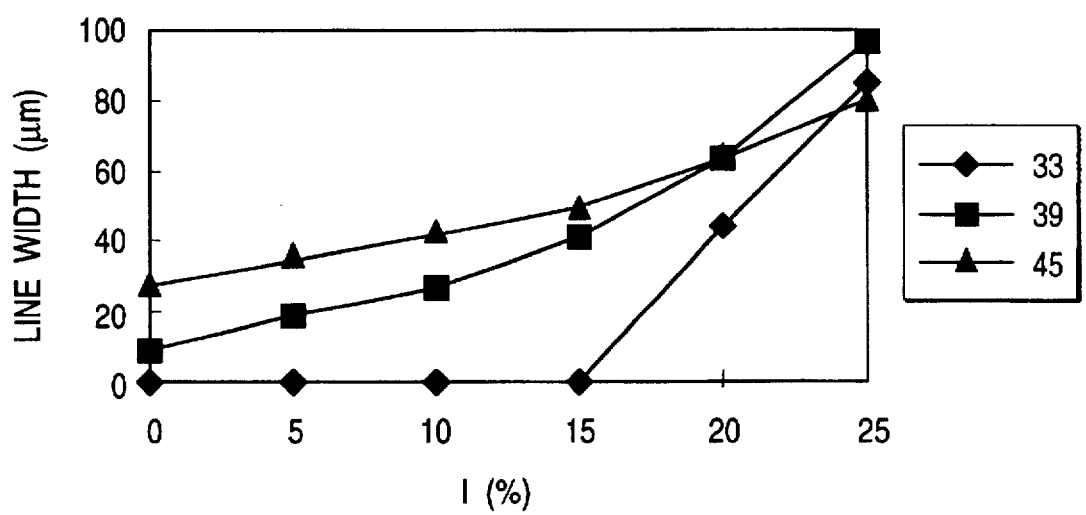
FIG. 19 is a plot that shows the relationship between the weak beam-to-intensive beam exposure ratio I and the width of the line (2) shown in FIG. 10 using the radius of the laser beam as a parameter.
Figures 20, 21:
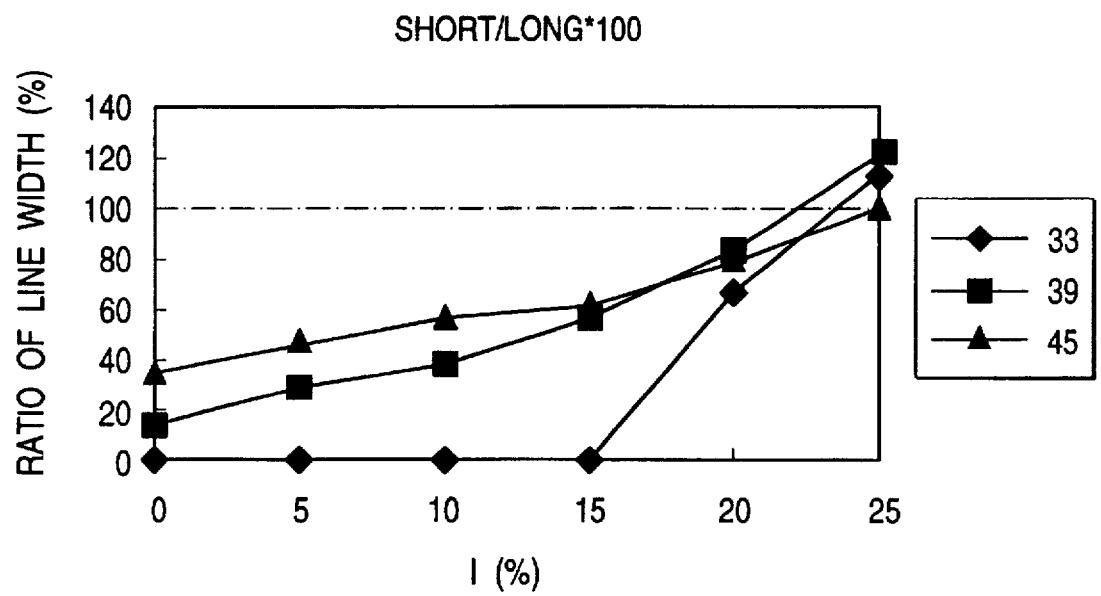
FIG. 20 is a plot-that shows the relationship between the weak beam-to-intensive beam exposure ratio I and a width ratio of the line (1) to the line (2) shown in FIG. 10 using the radius of the laser beam as a parameter.
FIG. 21 is a chart that shows a smoothing algorithm used in a second embodiment of the present invention.

FIG. 18 shows the relationship between the exposure ratio I of the weak beam to the intensive beam and the width of the line (1) shown in FIG. 10 using the radius of the laser beam as a parameter. FIG. 19 shows the relationship between the exposure ratio I of the weak beam to the intensive beam and the width of the line (2) shown in FIG. 10 using the radius of the laser beam as a parameter. Further, FIG. 20 shows the relationship between the exposure ratio I of the weak beam to the intensive beam and a line-segment ratio of the line (1) to the line (2) shown in FIG. 10 using the radius of the laser beam as a parameter.

Here, the line width was calculated by dividing the each pixel having 400 dpi resolution into 25 subdivisions in the case shown in FIGS. 18 and 19.

As a result of evaluation of the previously-described simulations, it turned out that no jaggies appeared on slanting lines when the lines (1) and (2) shown in FIG. 10 have the same width.

Evaluation results are as follows:

In the case of the laser beam having a radius of 33 µm, it turned out that a latent image was neither formed nor developed between dots which are a latent image area having a development bias of less than 400 V and serve as a practical development area.

In the case of the laser beam having a short radius of 33 µm and a long radius of 45 µm, it turned out that a practical development area was formed so as to become larger than the pixel size, as a result of which a resultant latent image became also larger than the pixel.

In the case of the laser beam having a short radius of 33 µm and a long radius of 39 µm, it turned out that the size of the latent image area, which had a development potential of less than 400 V and served as a practical development area, became substantially the same as the size of the pixel having 400 dpi resolution. Further, it turned out that a latent image was formed between the dots so as to link the dots together. It was also seen that the thickness of the dot in the position of the line (2) shown in FIG. 10 increased as the exposure ratio of the weak beam was increased. It is understood that if the weak beam is radiated at weak beam-to-intensive beam exposure ratios of 23.5% (in the case of the laser beam having a radius of 33 µm), 22.2% (in the case of the laser beam having a short radius of 33 µm and a long radius of 39 µm), and 25% (in the case of the laser beam having a short radius of 33 µm and a long radius of 45 µm), the widths of the lines (1) and (2) will be substantially the same.

Consequently, provided that the pixels are smoothed using the image forming apparatus of the present embodiment, it is understood that the latent image area having a development potential of less than 400V is developed in dot size and smoothed by the laser beam having a short radius of 33 µm and a long radius of 39 µm in the case of 400 dpi resolution. The practical development area changes depending on the radius of the laser beam, the shape of latent image, and the development bias.

(Second Embodiment)

An image forming apparatus of the second embodiment has substantially the same configuration as that of the image forming apparatus of the first embodiment. The image forming apparatus of the second embodiment is different from the image forming apparatus of the first embodiment only in having another smoothing algorithm for use in the exposure controller.

In the second embodiment, the white pixels o which form the background other than the black pixels which form the image section are exposed to the weak beam at the exposure level B (see FIGS. 6 and 7), as shown in FIG. 21.

Consequently, in the second embodiment, it becomes possible to carry out the smoothing treatment without use of the pattern determination section 57 used in the first embodiment. The image forming apparatus is simplified accordingly.

The semiconductor laser 231 is arranged so as to be constantly active even with respect to the white pixels in the second embodiment. However, for longer life, the semiconductor laser may be arranged so as to become active only with respect to, e.g., the white pixels [(i+1, j+1), (i, j+2), (i, j+3), (i+2, j), and (i+3, j)] adjoining the black pixels, as well as becoming inactive with respect to the other white pixels.

(Third Embodiment)

An image forming apparatus of the third embodiment has substantially the same configuration as that of the image forming apparatus of the first embodiment. The image forming apparatus of the third embodiment is provided with an exposure controller differing from that of the first embodiment.

Figure 22:
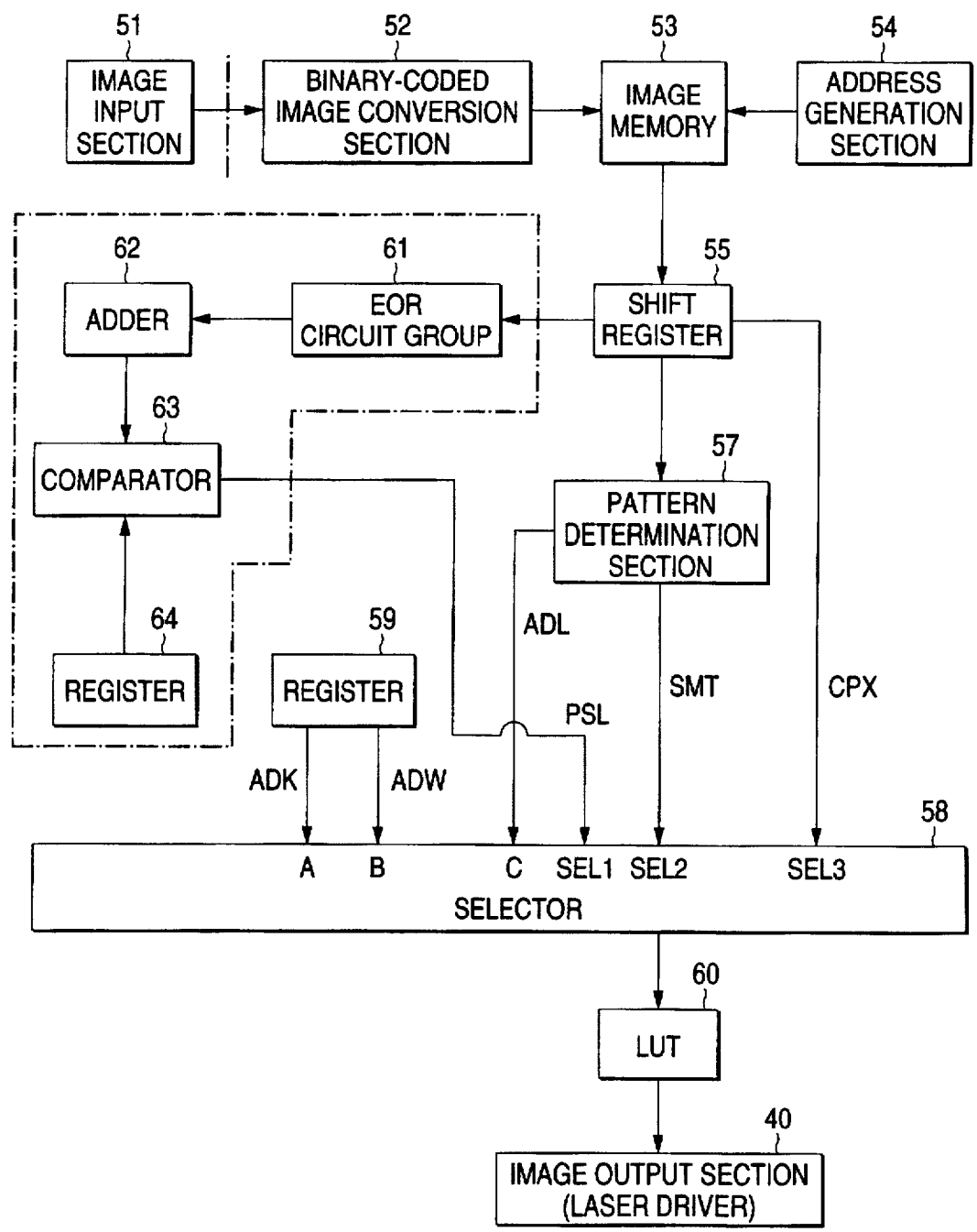
FIG. 22 is a block diagram that shows a specific example of an exposure controller used in a third embodiment of the present invention.
Figure 23:
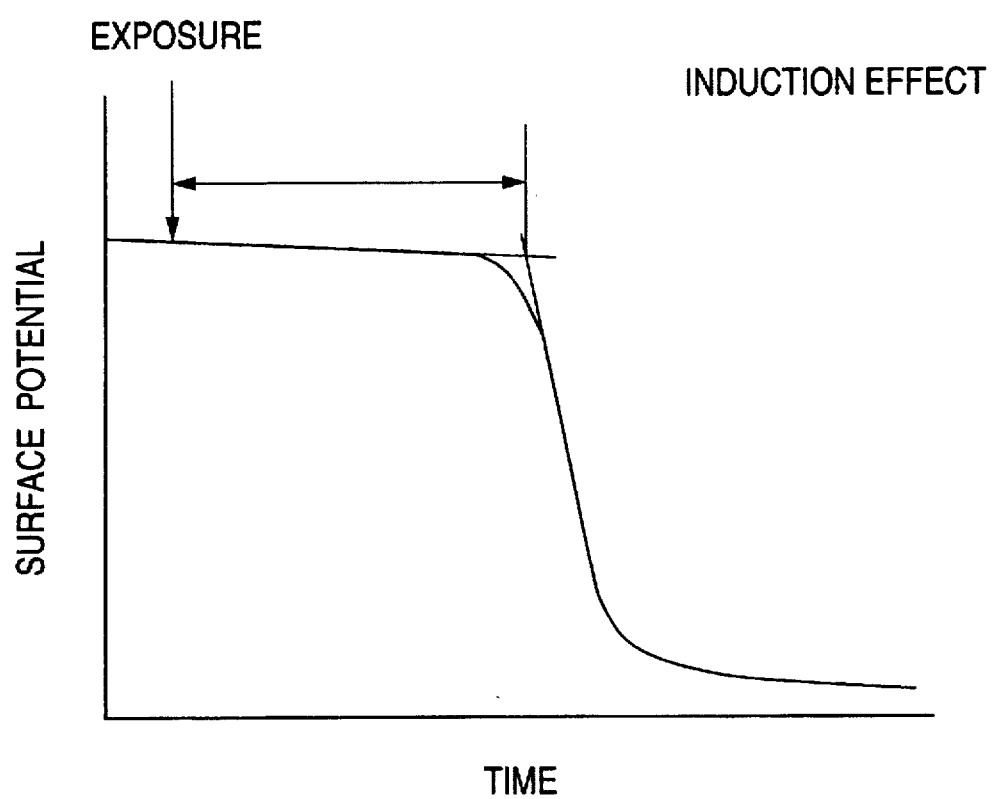
FIG. 23 is a plot showing the potential attenuation characteristics due to the induction effect of a single layer photosensitive body.

FIG. 22 shows the exposure controller used in the third embodiment.

As shown in the drawing, the essential configuration of the exposure controller of the present embodiment is substantially the same as that of the exposure controller of the first embodiment. Specifically, the exposure controller comprises the binary-coded image conversion section 52 that converts the image data received from the image input section 51, the image memory 53 that stores the thus-converted binary-coded image, and the address generation section 54 that outputs an address signal according to which the binary-coded image data in the image memory 53 are sequentially accessed in the primary scanning direction every 1-by-9 matrix of pixels, that is, a matrix with "one" pixel in the primary scanning direction and "nine" pixels in the secondary scanning direction. Further, the exposure controller comprises the shift register 55 that stores the binary image data of 17-by-9 matrix of pixels, that is, a matrix with "17" pixels in the primary scanning direction and "nine" pixels in the secondary scanning direction.

In the third embodiment, reference numerals 61 to 64 designate elements that constitute a processing section for identifying line images such as characters from an image. An EOR (exclusive-OR) circuit group consists of a plurality of exclusive-OR elements, each of which EXCLUSIVE-ORs the adjacent image data in the primary and secondary scanning directions within the reference area (i.e., a 17-by-9 matrix of pixels) and outputs the result of the calculation.

Reference numeral 62 is an adder that adds together signals of "zero" output from the EOR circuits and outputs the result of the addition. For example, the result of the addition of the signals is obtained for the case where only the pixel of interest in the reference area is black ("1") and all the other pixels are white ("0"). To begin with, the pixel of interest is adjacent to two pixels in each of the primary and secondary scanning directions. Signals of "one" are output from four EOR circuits that receive data signals related to these pixels and the pixel of interest. However, all the other EOR circuits output signals of "zero". Accordingly, the result of the adder 62 becomes four.

Reference numeral 63 designates a comparator. This comparator 63 compares the additional result output from the adder 62 with a threshold value stored in a register 64 (e.g., 90). If the additional result is larger than the threshold value, a conditional selection signal PSL of "one" is output. In the cases other than that, the conditional selection signal PSL of "zero" is output.

If the number of pixels that changed between black and white within the reference area is greater than the threshold value, the image in the reference area is identified as an image, and the conditional selection signal of "one" is output. In this case, the selector 58 selects either the data input terminal A or B depending on the data CPX related to the pixel of interest.

In contrast, if the number of pixels that changed between black and white within the reference area is less than the threshold value, the image in the reference area is identified as a line image, and the conditional selection signal of "zero" is output. In this case, the selector 58 selects the data input terminal C.

As in the first embodiment, the pattern determination section 57 compares the dot pattern of the reference area stored in the shift register 55 with various types of pattern and outputs the address signal ADL based on the matched patterns (which will be referred to as determination pattern conditions (see FIG. 9)). The address signal ADL specifies a read address of the look-up table (LUT) 6. Given that the address signal ADL is directly fed to the look-up table 60, image data corresponding to black pixels that satisfy the determination pattern condition are output from the look-up table 60.

The pattern determination section 57 outputs the pattern match signal SMT on the basis of the determination pattern condition. This pattern match signal SMT will become "one" if the determination pattern condition is effective. At all other times, the pattern match signal SMT becomes "zero."

If the dot pattern of the reference area does not satisfy any one of the pattern conditions, the address signal ADL will not be output, and the pattern match signal SMT becomes "zero".

Reference numeral 58 designates a selector that receives signals PSL, SMT, and CPX through selector input terminals SEL1 through 3. The selector 58 selects a signal from the address signals ADK, ADW, and ADL fed to data input terminals A–C, in response to the received signal. The thus-selected signal is output from the output terminal OUT.

The address signal ADK regarding a totally black pattern in the look-up table 60 is fed to the data input terminal A from the register 59. Similarly, the address signal ADW regarding a totally white pattern in the look-up table 60 is fed to the data input terminal B from the register 59.

The operation of the exposure controller of the third embodiment will now be described.

First, the image data received from the image input section 51 are converted into binary-coded image data via the binary-coded image conversion section 52. The thus-converted binary-coded image are stored in the image memory 53.

Next, the address generation section 54 sequentially reads a set of binary-coded image data (i.e., a one-by-nine matrix of pixels, or a pixel with "one" pixel in the primary scanning section and "nine" pixels in the secondary scanning direction) from the image memory 53. The thus-read binary-coded image data are stored in the shift register 55 while the contents of the shift register are shifted.

Then, the EOR circuit groups 61, the adder 62, the comparator 63, and the shift register 64 determine whether the image in the reference area of the shift register 55 is an image or a line image. If it is an image, the conditional selection signal of "one" is output. In contrast, if it is a line image, the conditional selection signal of "zero" is output.

Subsequently, the pattern determination section 57 determines which of the pattern conditions is satisfied by the reference area stored in the shift register 55.

If the dot pattern of the reference area does not any of the pattern conditions, the pattern match signal SMT will become "zero", and a dot will not be generated in the pixel of interest. In consequence, an image which is not subjected to smoothing treatment is output.

More specifically, the address signals ADK and ADW are fed to the look-up table 60 via the selector 58 irrespective of the conditional selection signal PSL. The look-up table 60 outputs image data associated with the pixels, and the thus-output image data are fed to the image output section 40 (corresponding to a laser driver).

In contrast, if the dot pattern of the reference area satisfies any one of the pattern conditions, the data input terminal C is selected on condition that the conditional selection signal PSL is "zero." The address signal ADL is fed to the look-up table 60 via the selector 58. The image data associated with intermediate pixels (i.e., pixels to be smoothed) are output from the look-up table 60, and the smoothed image data are fed to the image output section 40 (corresponding to the laser driver).

On condition that the conditional selection signal PSL is "one", the data input terminals A and B are selected. Then, the address signals ADK and ADW are fed to the look-up table 60 via the selector 58. The image data associated with the pixels are output from the look-up table 60, and the thus-output image data are fed to the image output section 40 (corresponding to the laser driver).

Execution of the above-described processing is determined on the basis of the contents of the reference area stored in the shift register 55. The selected state of the selector 58 is accordingly changed every time binary-coded image data are newly read from the image memory 53, and every time the contents of the shift register 55 is updated.

As described above, it is automatically identified whether the image in the reference area is a line image or an image in the third embodiment. If the line image is subjected to predetermined smoothing treatment, slanting lines of the line image will become smooth. As a result, the edge of the line image is prevented from becoming jagged.

It is possible to employ other types of known method to distinguish a line image from an image in the third embodiment. As in the first embodiment, the design of the pattern determination section 57 may be changed, as required. Further, it goes without saying that the smoothing algorithm used in the second embodiment can be used in the image forming apparatus of the third embodiment.

As has been described above, the present invention provides an image forming apparatus that uses a photosensitive body with potential characteristics (High-γ characteristics) which attenuate in a switching manner. In this image forming apparatus, black pixels which form an image area are exposed to an intensive beam having an exposure value at which the potential of the photosensitive body sharply attenuate. Of the white pixels being adjacent to the black pixels, at least the white pixels being recessed with respect to the surrounding black pixels are exposed to a weak beam having a exposure value at which the potential of the photosensitive body does not substantially attenuate. The exposure level of an overlap between the area of the beam which lies off the edge of the black pixel and the area exposed to the weak beam is set so as to be substantially equivalent to the exposure level of the intensive beam, whereby the pixels to be smoothed around the black pixels are effectively smoothed. Consequently, even if an image forming system has low resolution, edges of characters and line images are prevented from being jagged. In this way, it becomes possible to apply the photosensitive body with a sensitivity curve which attenuate in a switching manner, to the image forming system with low resolution.

In short, compared with the image forming apparatus that uses a photosensitive body whose potential attenuate according to the amount of incoming light, the image forming apparatus that uses the photosensitive body with High-γ characteristics can be improved so as to prevent the edge of a dot from being blurred when it is exposed. A clear image having high resolution can be formed. Therefore, it can be said that this type of image forming apparatus is desirable to be used in digitally forming an image. However, analog originally lies behind the smoothing technology used in the image forming apparatus that employs the photosensitive body whose potential attenuate according to the amount of incoming light. For this reason, it has been difficult to directly apply this smoothing technology to the image forming apparatus that uses the photosensitive body with the High-γ characteristics.

The present invention established a novel smoothing technology for use in an image forming apparatus that uses a photosensitive body with the High-γ characteristics and is preferable in digitally forming an image.

Particularly, if the present invention is arranged such that the pixels to be smoothed are extracted by use of a predetermined algorithm, and that only the thus-extracted pixels are exposed to a weak beam, the radiation means is prevented from being used unnecessarily, which in turn makes it possible to effectively increase the life of the radiation means.

In contrast, if the present invention is arranged such that at least the white pixels adjoining the black pixels are subjected to a weak beam, the smoothing processing itself can be simplified. Particularly, if all the white pixel are exposed to a weak beam, the smoothing processing can be significantly simplified.

Further, if the present invention is arranged such that the type of pixel is identified, and that the smoothing treatment is automatically effected only when the pixels form a line image, the operations required to instruct the necessity of smoothing treatment depending on the type of image will become unnecessary. As a result, the smoothing operations can be simplified.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image forming apparatus, comprising:

a photosensitive body having potential attenuation characteristics in which a potential (VP) of a uniformly charged surface of the photosensitive body sharply drops at the time when an exposure value exceeds a certain value (A0);

charging means for electrifying said photosensitive body;

exposure means for writing a latent image corresponding to an image pattern on said photosensitive body electrified by said charging means by exposing said photosensitive body to a beam, said exposure means including radiation means a exposure value of which is variably set and which is capable of blinking on a pixel-by-pixel basis;

development means for forming a visible image from the latent image; and exposure control means for controlling said exposure means, said exposure control means including exposure pattern determination means for determining an exposure pattern according to the image pattern, and exposure value switching means for switching between an exposure value (A1) at which the potential of said photosensitive body sharply attenuate and an exposure value (A2) at which the potential of said photosensitive body does not substantially attenuate, on the basis of the exposure pattern determined by said exposure pattern determination means;

wherein said exposure pattern determination means includes image area processing means that exposes image pixels which form an image area of the image pattern to an intensive beam having the exposure value (A1) at which the potential of said photosensitive body sharply attenuate; and smoothing processing means that exposes at least white pixels being adjacent to the image pixels among the white pixels which form a background of the image pattern to a weak beam having the exposure value (A2) at which the potential of said photosensitive body does not substantially attenuate.

2. The image forming apparatus as defined in claim 1, wherein the diameter of the beam radiated to said photosensitive body from said radiation means is set so as to become larger than at least the diameter of the pixel when said photosensitive body is exposed to the beam at the exposure level (A1), and an exposure level of an overlapping area between the area of the beam that lies off the edge of the pixel exposed to the intensive beam at the exposure level (A1) and the area exposed to the weak beam at the exposure level (A2) become substantially equivalent to the exposure level (A1).

3. The image forming apparatus as defined in claim 1, further comprising image type identification means that distinguishes a line image area from an image area of the image pattern;

wherein said smoothing processing means smooth only the line image area identified by said image type identification means.

4. An image forming apparatus, comprising:

a photosensitive body having potential attenuation characteristics in which a potential (VP) of a uniformly charged surface of the photosensitive body sharply drops at the time when an exposure value exceeds a certain value (A0);

charging means for electrifying said photosensitive body;

exposure means for writing a latent image corresponding to an image pattern on said photosensitive body electrified by said charging means by exposing said photosensitive body to a beam, said exposure means including radiation means a exposure value of which is variably set and which is capable of blinking on a pixel-by-pixel basis;

development means for forming a visible image from the latent image; and exposure control means for controlling said exposure means, said exposure control means including exposure pattern determination means for determining an exposure pattern according to the image pattern, and exposure value switching means for switching between an exposure value (A1) at which the potential of said photosensitive body sharply attenuate and an exposure value (A2) at which the potential of said photosensitive body does not substantially attenuate, on the basis of the exposure pattern determined by said exposure pattern determination means;

wherein said exposure pattern determination means includes: image area processing means that exposes image pixels which form an image area of the image pattern to an intensive beam having the exposure value (A1) at which the potential of said photosensitive body sharply attenuate; and smoothing processing means that extracts at least white pixels being adjacent to the image pixels and being locally recessed with respect to surrounding image pixels from among all the white pixels which form a background of the image pattern as well as exposes the thus-extracted white pixels to a weak beam having the exposure value (A2) at which the potential of said photosensitive body does not substantially attenuate.

5. The image forming apparatus as defined in claim 1, wherein said smoothing processing means extracts a pixel of interest as a pixel to be smoothed on the basis of the positional relationship between the image pixels which form the image area and the white pixels which form the background of all the pixels that constitute the image pattern, as well as exposing the thus-extracted pixel to be smoothed to the weak beam having the exposure value (A2) at which the potential of said photosensitive body does not substantially attenuate, on condition that the pixel of interest is a white pixel, and that a pixel being diagonally opposite to the pixel of interest and adjacent pixels are image pixels.

6. The image forming apparatus as defined in claim 1, wherein the diameter of the beam radiated to said photosensitive body from said radiation means is set so as to become larger than at least the diameter of the pixel when said photosensitive body is exposed to the beam at the exposure level (A1), and an exposure level of an overlapping area between the area of the beam that lies off the edge of the pixel exposed to the intensive beam at the exposure level (A1) and the area exposed to the weak beam at the exposure level (A2) become substantially equivalent to the exposure level (A1).

7. The image forming apparatus as defined in claim 1, further comprising image type identification means that distinguishes a line image area from an image area of the image pattern;

wherein said smoothing processing means smooth only the line image area identified by said image type identification means.

* * * * *